United States Patent
Bossemeyer, Jr. et al.

(10) Patent No.: US 7,058,625 B2
(45) Date of Patent: Jun. 6, 2006

(54) CUSTOMER FEEDBACK ACQUISITION AND PROCESSING SYSTEM

(75) Inventors: Robert Wesley Bossemeyer, Jr., St. Charles, IL (US); Dennis Connolly, Wheaton, IL (US)

(73) Assignee: SBC Properties, L.P., Reno, NV (US)

( * ) Notice: Subject to any disclaimer, the term of this patent is extended or adjusted under 35 U.S.C. 154(b) by 399 days.

(21) Appl. No.: 10/242,118

(22) Filed: Sep. 12, 2002

(65) Prior Publication Data

US 2003/0041056 A1  Feb. 27, 2003

Related U.S. Application Data

(62) Division of application No. 09/356,668, filed on Jul. 19, 1999, now Pat. No. 6,510,427.

(51) Int. Cl.
*G06F 17/30* (2006.01)

(52) U.S. Cl. ............................................. 707/3

(58) Field of Classification Search ................ 707/1, 707/3, 10
See application file for complete search history.

(56) References Cited

U.S. PATENT DOCUMENTS

| | | | |
|---|---|---|---|
| 4,430,726 A | 2/1984 | Kasday | |
| 4,841,387 A | 6/1989 | Rindfuss | |
| 4,908,866 A | 3/1990 | Goldwasser et al. | |
| 5,136,655 A | 8/1992 | Bronson | |
| 5,303,299 A | 4/1994 | Hunt et al. | |
| 5,500,920 A | 3/1996 | Kupiec | |
| 5,526,407 A | 6/1996 | Russell et al. | |
| 5,553,119 A | 9/1996 | McAllister et al. | |
| 5,600,756 A | 2/1997 | Ely | |
| 5,619,708 A | 4/1997 | Ho | |
| 5,642,518 A | 6/1997 | Kiyama et al. | |
| 5,704,060 A | 12/1997 | Del Monte | |
| 5,734,794 A | 3/1998 | White | |
| 5,787,421 A | 7/1998 | Nomiyama | |
| 5,809,464 A | 9/1998 | Kopp et al. | |
| 5,822,744 A * | 10/1998 | Kesel | 706/52 |
| 5,832,433 A | 11/1998 | Yashchin et al. | |
| 5,835,912 A | 11/1998 | Pet | |
| 5,848,389 A | 12/1998 | Asano et al. | |
| 6,032,184 A * | 2/2000 | Cogger et al. | 709/223 |
| 6,115,693 A * | 9/2000 | McDonough et al. | 705/10 |
| 6,189,029 B1 * | 2/2001 | Fuerst | 709/217 |
| 6,349,290 B1 * | 2/2002 | Horowitz et al. | 705/35 |
| 6,862,710 B1 * | 3/2005 | Marchisio | 715/501.1 |

OTHER PUBLICATIONS

U.S. Appl. No. 60/125,714, Giovanni Marchisio Mar. 23, 1999.*

* cited by examiner

*Primary Examiner*—Jeffrey Gaffin
*Assistant Examiner*—Haythim Alaubaidi
(74) *Attorney, Agent, or Firm*—Brinks Hofer Gilson & Lione

(57) ABSTRACT

A customer feedback acquisition and processing system is disclosed. Customer feedback, which may optionally include voice signals, is captured and stored in a database. The database can be searched to develop a subset of records pertaining to an area of interest. A data mining tool can then be used on the subset to identify trend(s) in the customer feedback records. The database tool assigns relevance scores to each word ("concept") in one or more fields of the records in the subset. It then combines the concepts and develops new relevance scores for the combined concepts to identify trend(s) in the customer feedback records.

17 Claims, 22 Drawing Sheets

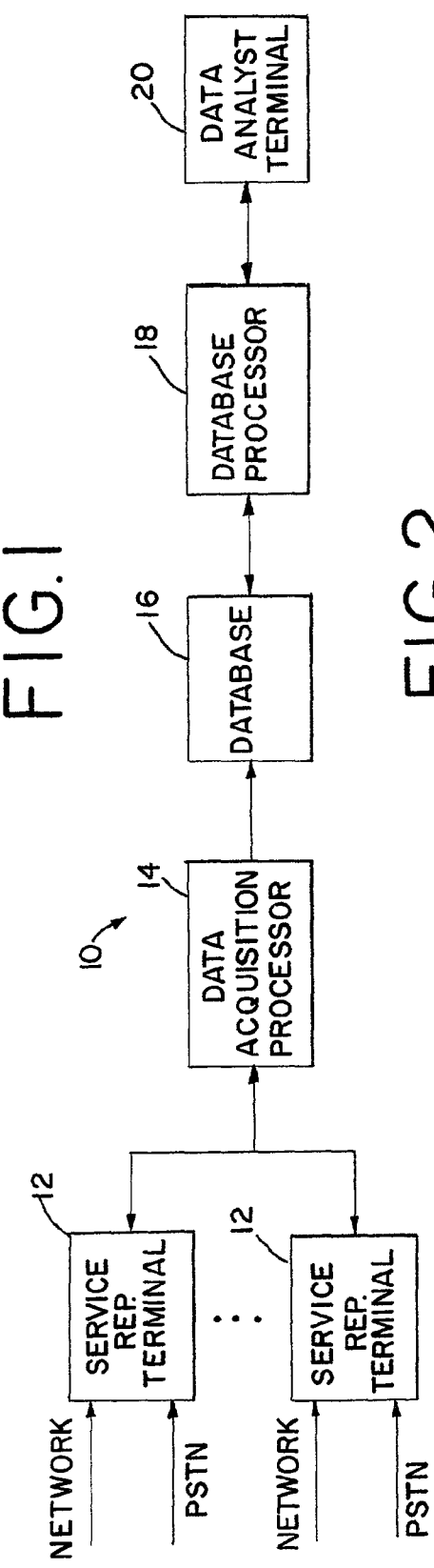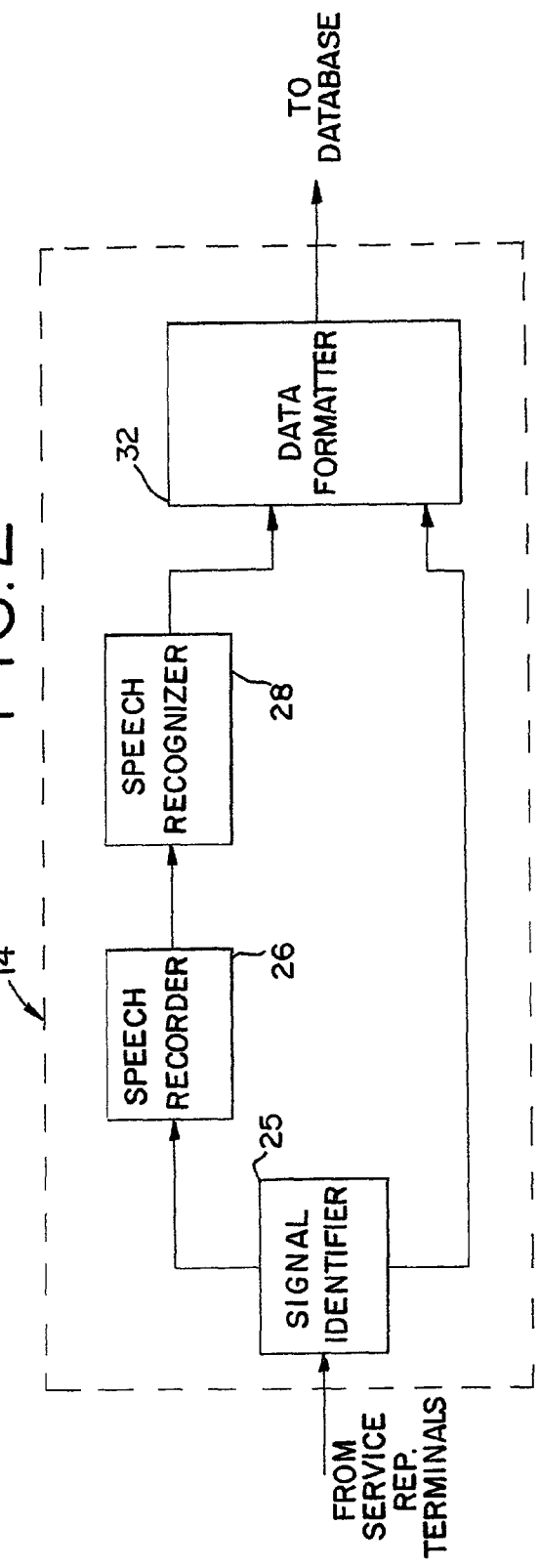

| | PRODUCT CODE | DATE | TIME | REASON CODE | COMMENTS | TEXTUAL INFORMATION |
|---|---|---|---|---|---|---|
| RECORD 1 | | | | | | |
| RECORD 2 | | | | | | |
| RECORD 3 | | | | | | |
| ⋮ | | | | | | |
| RECORD X | | | | | | |

FIG.5

| USOC | REASON | COMMENT |
|------|--------|---------|
| TDGIA | R02 | 001 MR. CORRIE SAYS PHONE DOES NOT RING AND DOES NOT WANT IT |
| TDGIA | R02 | 001 MRS. PARKER WANTS TO RETURN BECAUSE THIS UNIT DOESN'T WORK FOR THE PERSON SHE BOU |
| TDGIA | R02 | 001 CUSTOMER THOUGHT THAT SHE ORDERED THE PHONE WITH THE CALLER I.D. AMR0090 |
| TDGIA | R02 | 001 BACHUS STATES PHONE ALWAYS FALLS THAT CORD IS MADE FUNNY (TOO SHORT) 0212 |
| TDGIA | R02 | 001 NOT WHAT SHE WANTED 0062 |
| TDGIA | R02 | 001 MRS. MASALKO SAYS THAT THE PHONE ISN'T FOR HER. 0074 |
| TDGIA | R02 | 001 MS. GARLITZ DOESN'T LIKE. 0346 |
| TDGIA | R02 | 001 CUSTOMER ISN'T SATISFIED WITH PHONE. 0279 |
| TDGIA | R02 | 001 CS-LABEL SENT TO CUSTOMER. INSTRUCTIONS GIVEN ON RETURNING VIA UPS... 0176 |
| TDGIA | R02 | 001 CUSTOMER DOES NOT LIKE THE PHONE BECAUSE THE HANDSET IS TOO SMALL AND HARD TO HOLD |
| TDGIA | R02 | 001 CS-0137 |
| TDGIA | R02 | 001...ADVISED OF LABEL AND PROCEDURE TO FOLLOW FOR RETURN. 0423 |
| TDGIA | R02 | 001- MR. GEORGE DOES NOT WANT PHONE. ADVISED THAT UPS LABELS WOULD BE SENT |
| TDGIA | R02 | 001 MRS. SHIPPERS INFORMED THAT SHE JUST DOES NOT LIKE ANYTHING ABOUT THE PHONE. 0417 |
| TDGIA | R02 | 001 CUSTOMER CANNOT FIT LITTLE PICTURES IN THE BUTTON SLOTS. 0390 |
| TDGIA | R02 | 001 CUSTOMER CAN'T HEAR AND IS VERY ELDERLY. 0283 |
| TDGIA | R02 | 001 RINGER DOES NOT WORK. 0431 |
| TDGIA | R02 | 001 MS. SABRI WAS UNHAPPY WITH PHONE INFORMED HER OF RETURN POLICY 0438 |
| TDGIA | R02 | 001 MS SCLIMENTI DOESN'T LIKE PHONE. 0125 |
| TDGIA | R02 | 001 NOT PRACTICAL FOR HIS HEARING PURPOSES-HE'S HEARING IMPAIRED 0256 |
| TDGIA | R02 | 001 HER MOTHER WON'T USE IT. 0387 |
| TDGIA | R02 | 001 MR NELSON CALLED STATED PHONE DOES NOT MEET NEEDS ADVSD CUS WILL PROCESS RETURN |
| TDGIA | R02 | 001 DID NOT FIT IN HER STAND 0278 |
| TDGIA | R02 | 001 MS LEWIS DIDN'T LIKE PHONE 0429 |
| TDGIA | R02 | 001 DID NOT LIVE UP TO THE CUSTOMER'S EXPECTATIONS. 0351 |

919 RECORDS

FIG. 6

| CONCEPT | RELEVANCE | COUNT |
|---|---|---|
| <BIG> | 0.0832 | 41 |
| <ENOUGH> | 0.0730 | 86 |
| <LOUD> | 0.0700 | 72 |
| <HEARING> | 0.0479 | 35 |
| <RING> | 0.0295 | 40 |
| <FIT> | 0.0294 | 15 |
| <RINGER> | 0.0254 | 31 |
| <MOTHER> | 0.0195 | 19 |
| <ELDERLY> | 0.0172 | 16 |
| <GIFT> | 0.0155 | 17 |
| <HARD> | 0.0148 | 13 |
| <BOUGHT> | 0.0147 | 15 |
| <WALL> | 0.0140 | 13 |
| <VOLUME> | 0.0111 | 35 |
| <SMALL> | 0.0109 | 14 |
| <HEAR> | 0.0105 | 51 |
| <LIKE> | 0.0102 | 236 |
| <SATISFIED> | 0.0100 | 16 |
| <MIND> | 0.0100 | 17 |
| <DAUGHTER> | 0.0082 | 16 |
| <DOESN'T> | 0.0074 | 102 |
| <TOO> | 0.0074 | 67 |
| <ISN'T> | 0.0071 | 20 |
| <LIGHT> | 0.0067 | 14 |
| <CAN'T> | 0.0063 | 33 |
| <THOUGHT> | 0.0063 | 22 |
| <DON'T> | 0.0057 | 20 |

FIG. 7

| CONCEPT | RELEVANCE | COUNT |
|---|---|---|
| < LOUD, ENOUGH > | 35.4424 | 69 |
| < BIG > | 0.0832 | 41 |
| < ENOUGH > | 0.0730 | 86 |
| < LOUD > | 0.0700 | 72 |
| < HEARING > | 0.0479 | 35 |
| < RING > | 0.0295 | 40 |
| < FIT > | 0.0294 | 15 |
| < RINGER > | 0.0254 | 31 |
| < MOTHER > | 0.0195 | 19 |
| < ELDERLY > | 0.0172 | 16 |
| < GIFT > | 0.0155 | 17 |
| < HARD > | 0.0148 | 13 |
| < BOUGHT > | 0.0147 | 15 |
| < WALL > | 0.0140 | 13 |
| < VOLUME > | 0.0111 | 35 |
| < SMALL > | 0.0109 | 14 |
| < HEAR > | 0.0105 | 51 |
| < LIKE > | 0.0102 | 236 |
| < SATISFIED > | 0.0100 | 16 |
| < MIND > | 0.0100 | 17 |
| < DAUGHTER > | 0.0082 | 16 |
| < DOESN'T > | 0.0074 | 102 |
| < TOO > | 0.0074 | 67 |
| < ISN'T > | 0.0071 | 20 |
| < LIGHT > | 0.0067 | 14 |
| < CAN'T > | 0.0063 | 33 |
| < THOUGHT > | 0.0063 | 22 |
| < DON'T > | 0.0057 | 20 |

FIG. 8

| CONCEPT | RELEVANCE | COUNT |
|---|---|---|
| <RING,LOUD,ENOUGH> | 5664.7368 | 24 |
| <LOUD,ENOUGH> | 35.4424 | 69 |
| <BIG> | 0.0832 | 41 |
| <ENOUGH> | 0.0730 | 86 |
| <LOUD> | 0.0700 | 72 |
| <HEARING> | 0.0479 | 35 |
| <RING> | 0.0295 | 40 |
| <FIT> | 0.0294 | 15 |
| <RINGER> | 0.0254 | 31 |
| <MOTHER> | 0.0195 | 19 |
| <ELDERLY> | 0.0172 | 16 |
| <GIFT> | 0.0155 | 17 |
| <HARD> | 0.0148 | 13 |
| <BOUGHT> | 0.0147 | 15 |
| <WALL> | 0.0140 | 13 |
| <VOLUME> | 0.0111 | 35 |
| <SMALL> | 0.0109 | 14 |
| <HEAR> | 0.0105 | 51 |
| <LIKE> | 0.0102 | 236 |
| <SATISFIED> | 0.0100 | 16 |
| <MIND> | 0.0100 | 17 |
| <DAUGHTER> | 0.0082 | 16 |
| <DOESN'T> | 0.0074 | 102 |
| <TOO> | 0.0074 | 67 |
| <ISN'T> | 0.0071 | 20 |
| <LIGHT> | 0.0067 | 14 |
| <CAN'T> | 0.0063 | 33 |
| <THOUGHT> | 0.0063 | 22 |
| <DON'T> | 0.0057 | 20 |

FIG. 9

| CONCEPT | RELEVANCE | COUNT |
|---|---|---|
| <DOES,NOT,RING,LOUD,ENOUGH> | 271461.0797 | 10 |
| <DOESN'T,RING,LOUD,ENOUGH> | 74838.3876 | 7 |
| <STATES,RINGER,LOUD,ENOUGH> | 55445.8079 | 4 |
| <RINGER,NOT,LOUD,ENOUGH> | 16648.1515 | 12 |
| <LOUD,OF,HEARING,ENOUGH> | 12030.4281 | 4 |
| <RING,LOUD,ENOUGH> | 5664.7368 | 24 |
| <LOUD,ENOUGH> | 35.4424 | 69 |
| <BIG> | 0.0832 | 41 |
| <ENOUGH> | 0.0730 | 86 |
| <LOUD> | 0.0700 | 72 |
| <HEARING> | 0.0479 | 35 |
| <RING> | 0.0295 | 40 |
| <FIT> | 0.0294 | 15 |
| <RINGER> | 0.0254 | 31 |
| <MOTHER> | 0.0195 | 19 |
| <ELDERLY> | 0.0172 | 16 |
| <GIFT> | 0.0155 | 17 |
| <HARD> | 0.0148 | 13 |
| <BOUGHT> | 0.0147 | 15 |
| <WALL> | 0.0140 | 13 |
| <VOLUME> | 0.0111 | 35 |
| <SMALL> | 0.0109 | 14 |
| <HEAR> | 0.0105 | 51 |
| <LIKE> | 0.0102 | 236 |
| <SATISFIED> | 0.0100 | 16 |
| <MIND> | 0.0100 | 17 |
| <DAUGHTER> | 0.0082 | 16 |
| <DOESN'T> | 0.0074 | 102 |
| <TOO> | 0.0074 | 67 |
| <ISN'T> | 0.0071 | 20 |
| <LIGHT> | 0.0067 | 14 |
| <CAN'T> | 0.0063 | 33 |
| <THOUGHT> | 0.0063 | 22 |
| <DON'T> | 0.0057 | 20 |

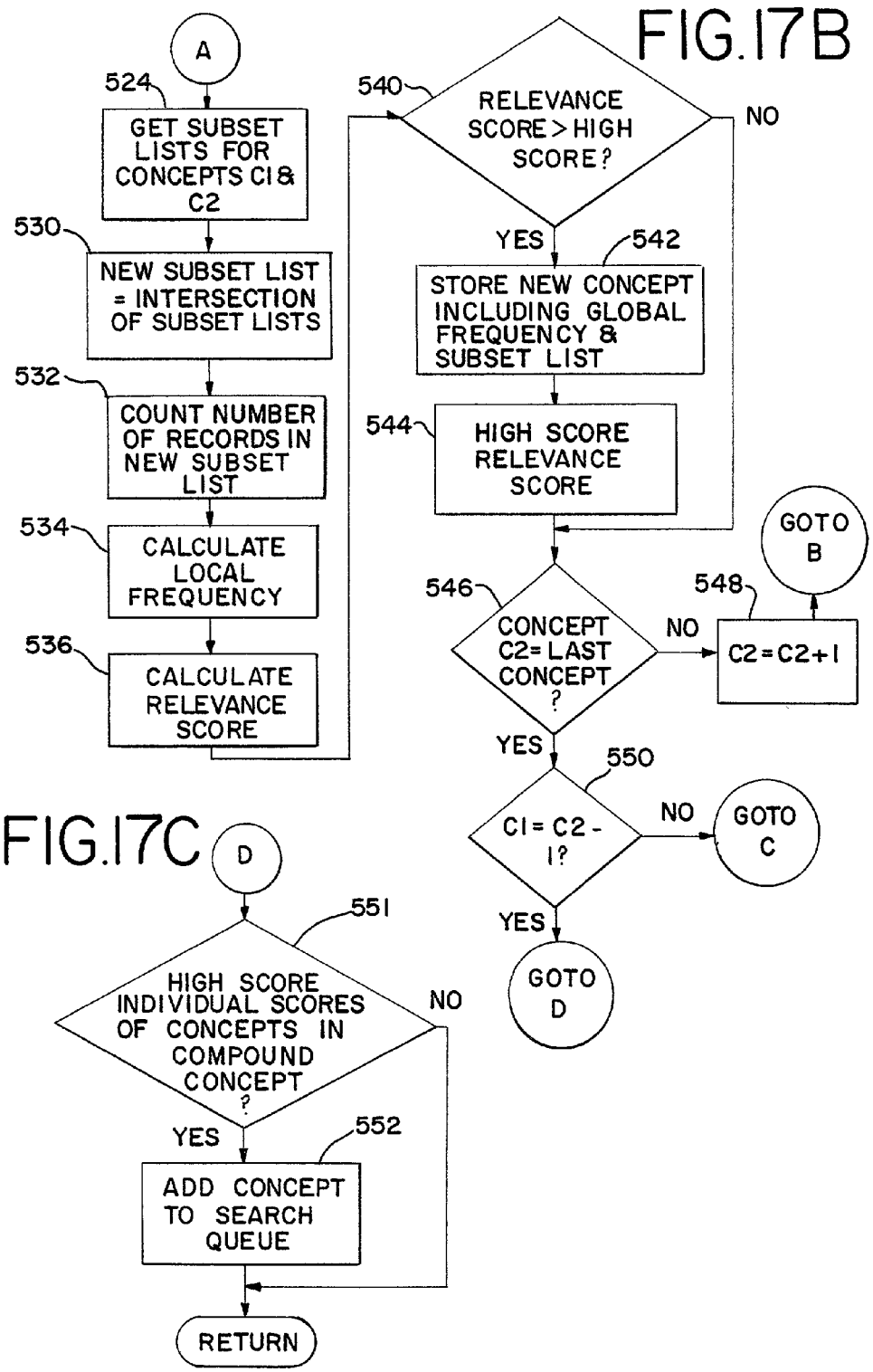

CUSTOMER FEEDBACK ACQUISITION AND PROCESSING SYSTEM

This application is a division of application Ser. No. 09/356,668, filed Jul. 19, 1999, now U.S. Pat. No. 6,510,427, which is hereby incorporated by reference herein.

FIELD OF THE INVENTION

The present invention relates generally to information acquisition and processing systems and, more particularly, to a customer feedback acquisition and processing system for use in obtaining, organizing and analyzing customer feedback related to products and services.

BACKGROUND OF THE INVENTION

For years, businesses that sell products or provide services have provided their customers or clients with avenues to register comments, complaints or suggestions relevant to the products or services provided by the business. These avenues have included customer feedback postcards and toll free numbers that consumers may call to speak with a service representative.

Traditionally, received feedback postcards have been filed in an order relevant to the products or services to which they pertain. Any analysis of the data provided by the postcards required a data analyst to individually process handwritten, and sometimes unreadable, postcards to determine trends in the customer comments on the postcards.

Service representatives answering toll free lines have traditionally completed paper-based customer comment forms as they speak to the customer. These handwritten comment forms were processed in a mariner similar to the postcards. Specifically, they were filed and hand-analyzed by a data analyst at a later time.

In recent years, the advent of the computer has modified how customer feedback is acquired, retained and processed. Handwritten data from feedback postcards may now be keyed or scanned into, and stored by, a computer in an electronic format. Similarly, computer use has simplified the acquisition of information that is provided by customers during calls. Specifically, service representatives may now use a computer terminal with an interface that allows the input of various pieces of information including, for example, an identification of the product or service about which the call was made, the time and date of the call and the comments made by the caller. Additionally, the popularity of network communications over the Internet now allows businesses to receive customer comments via electronic mail (email) and web page feedback techniques.

Although the use of computers has simplified the acquisition of customer feedback from telephone calls, the value of the acquired data is dependent on the level of detail the receiving service representatives enter into their terminal user interfaces. Ideally, the service representatives would enter all of the callers' comments into the terminal. However, while some service representatives may enter lengthy customer comments, others may enter very brief descriptions. These brief descriptions may or may not be succinct and descriptive sentences that are meaningful. Accordingly, the quality of the information acquired depends solely on the quality of the service representative's characterization of the telephone call with the customer.

Once information pertaining to customer feedback has been acquired electronically, it is useful to analyze the collected data to determine, for example, where improvements in products or services should be made. As noted, the information acquired for each product or service may be analyzed by an analyst who looks for trends in the feedback. Hand analysis of the data is a time consuming and arduous task. If a business offers many products or services, many person-hours must be spent analyzing the customer feedback to determine a trend in the data.

BRIEF DESCRIPTION OF THE DRAWINGS

FIG. 1 is a schematic illustration of a customer feedback acquisition and processing system constructed in accordance with the teachings of the invention.

FIG. 2 is a more detailed schematic illustration of the data acquisition processor shown in FIG. 1.

FIG. 5 is an exemplary search result that may be obtained by execution of the search engine and queue generator of FIG. 4 in response to certain exemplary search criteria.

FIG. 6 is an exemplary search queue that may be obtained by execution of the search engine and queue generator, the relevance computer and the relevance sorter of FIG. 4.

FIG. 7 is an exemplary search queue that may be obtained by performing a merge cycle on the search queue of FIG. 6.

FIG. 8 is an exemplary search queue that may be obtained by performing a merge cycle on the search queue of FIG. 7.

FIG. 9 is an exemplary search queue that may be obtained by performing a merge cycle on the search queue of FIG. 8.

FIGS. 17A–17C is a flow chart illustrating an exemplary merger routine called by the main routine of FIGS. 14A–14B.

DESCRIPTION OF THE PREFERRED EMBODIMENTS

Figures 3, 4:
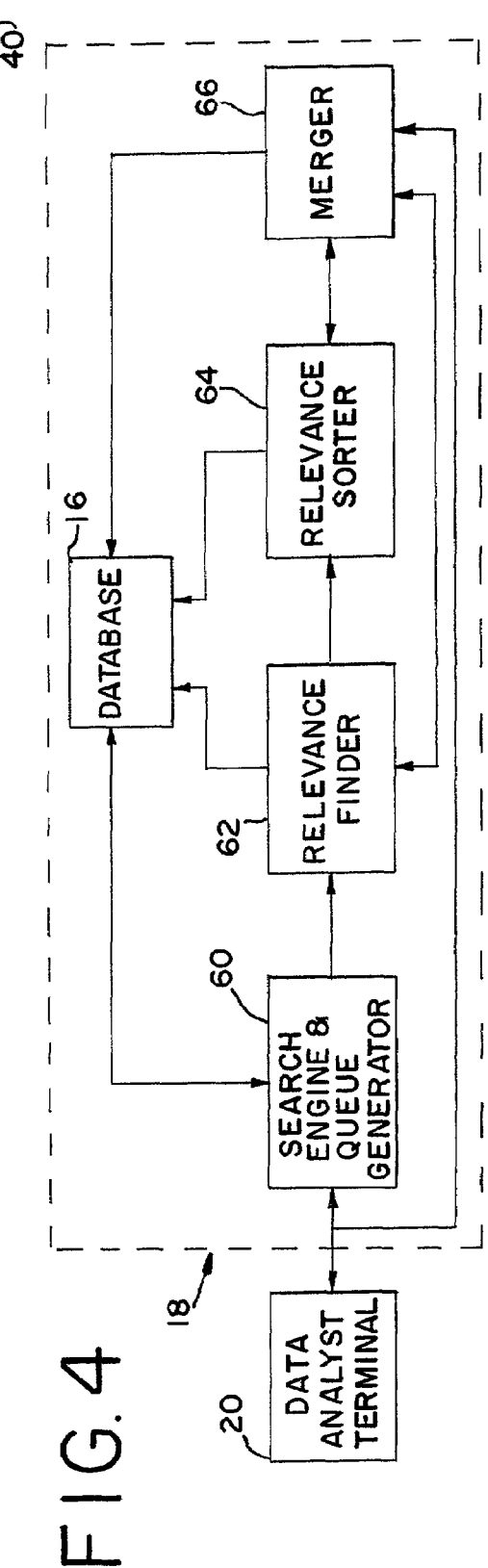
FIG. 3 is an exemplary data structure that may be created by the data formatter of FIG. 2 and stored in the database of FIG. 1.
FIG. 4 is a more detailed schematic illustration of the database processor of FIG. 1.

A customer feedback acquisition and processing system (CFAPS) 10 constructed in accordance with the teachings of the invention is schematically illustrated in FIG. 1. Generally, the CFAPS 10 includes a plurality of service representative terminals 12, a data acquisition processor 14, a database 16, a database processor 18 and one or more data analyst terminals 20. A service representative working at one of the service representative terminals 12 may receive customer feedback from either a telephone call via a PSTN connection or from an electronic message (e.g., an email message or a web page message) via a network. The receipt of one telephone call, one email message or one web page message is referred to herein as one customer feedback instance.

When a customer feedback instance occurs, a customer feedback message is created and forwarded to the data acquisition processor 14 for storage in the database 16 as a record. For example, if the customer feedback instance is initiated by a telephone call, the service representative will converse with the customer. The service representative may summarize the pertinent information from the conversation and enter the summarized information (e.g., profile information) into the service representation terminal 12 via a graphical user interface. The data entered by the service representative and the audio from the call is forwarded to the data acquisition processor 14 in a customer feedback message. The data acquisition processor 14 parses the message into segments and stores the segments in certain predefined fields of a record in the database 16. Preferably, the voice data from the telephone call is recorded in its entirety and converted from audio information to text information by the data acquisition processor 14 using a large vocabulary speech recognition technology. The text information from the audio data is then stored in association with the summary information provided by the service representative. By way of examples, not limitations, the profile information provided by the service representative may optionally include an identification of the product or service to which the customer feedback instance pertains, the date and/or time the customer feedback instance was received, the reason for the customer feedback, and/or comments regarding the customer feedback. As will be appreciated by persons of ordinary skill in the art, various standardized codes may be defined to represent the product or service about which the feedback was received (e.g., KEP70=a two line telephone, TDG1A=a big button telephone, etc.). Additionally, a standardized code may be used to represent various reasons for the customer feedback (e.g., R02=product return, R03=product complaint, etc.). Therefore, a customer feedback instance that is received because of a product return of a big button telephone may be represented by codes such as TDG1A and R02.

The data acquisition processor 14 composites the profile information from the service representative and the text information from the customer (if any) into a single record which is written to the database 16. One record is created for each customer feedback instance. Accordingly, the database 16 includes as many records as there are customer feedback instances. The data acquisition processor 14 is described in further detail below.

Although persons or ordinary skill in the art will readily appreciate that the service representation terminal(s) 12 can be implemented in many ways without departing from the scope or spirit of the invention, in the preferred embodiment, the service representation terminals 12 are implemented by networked personal computers.

For the purpose of analyzing data in the database 16, the CFAPS 10 is provided with the database processor 18. As shown in FIG. 1, the database processor 18 communicates information to and receives information from both the database 16 and the data analyst terminal 20. The database processor 18 is responsive to commands received from the data analyst terminal 20 to access the database 16 and, among other things, to copy, change and/or manipulate the records stored therein. The data analyst terminal 20 preferably includes a graphical user interface (GUI) that allows a data analyst using the data analyst terminal 20 to control the database processor 18. Using the GUI of the data analyst terminal 20, the data analyst may command the database processor 18 to perform various functions on the records stored in the database 16. These functions may include, but are not limited to, copying records, sorting records, searching for particular records, determining the relevance of a word or group of words (referred to hereinafter as concepts) appearing in the records and combining concepts and determining the relevance of the combined concepts. For example, a data analyst may wish to search for all data relevant to product returns for a specific product (e.g., the big button telephone). To carry out such a search, the analyst may enter search criteria specifying the product (e.g., TDG1A for the big button telephone) and feedback rationale (e.g., R02 for product returns) into product and reason fields in the GUI of the data analyst terminal 20. The database processor 18 is described in further detail below with reference to FIGS. 4 and 10–11.

Although for descriptive purposes the data acquisition processor 14 is shown as a stand-alone entity, persons or ordinary skill in the art will readily appreciate that the data acquisition processor 14 may be implemented in either the service representative terminals 12 or the database 16 without departing from the scope or spirit of the invention. Likewise, persons of ordinary skill in the art will recognize that, although for ease of illustration the database processor 18 is shown as a stand-alone entity in FIG. 1, the database processor 18 may be implemented in either the data analyst terminal 20 or the database 16 without departing from the scope or the spirit of the invention. Preferably, however, a data acquisition processor 14 is resident in each of the service representative terminals 12 and a database processor 18 is resident in each of the data analyst terminals 20. Additionally, although a plurality of service representative terminals 12 and a single data analyst terminal are shown in FIG. 1, different numbers of service representative terminal(s) 12 (including one) and/or data analyst terminal(s) 20 may be employed without departing from the scope or spirit of the invention. Moreover, it will be readily understood by persons of ordinary skill in the art that the service representative terminal 12 and the data analyst terminal 20 may optionally be combined into a single terminal that performs both the data acquisition and the data processing functions described herein.

As shown in FIG. 2, the data acquisition processor 14 preferably includes a signal identifier 25, a speech recorder 26, a speech recognizer 28, and a data formatter 32. As its name suggests, the signal identifier 25 examines the input signals received from the service representative terminal(s) 12 and determines whether the received signal is an audio signal (e.g., from a conversation on a telephone). If the examined input signal is an audio signal, it is routed to the speech recorder 26. Otherwise, the input signal is sent directly to the data formatter 32.

Assuming a customer feedback instance is associated with a telephone call, the audio from the call is preferably communicated to the speech recorder 26. The speech recorder 26 stores the audio from the call in either analog or digital format until the speech recognizer 28 is activated. When activated, the speech recognizer 28 converts the stored audio from the speech recorder 26 into text information that can be more easily stored and searched in the database 16. Persons of ordinary skill in the art will appreciate that, if the speech recognizer 28 is adapted to process audio data in real time, the speech recorder 26 may optionally be eliminated from the data acquisition processor 14. The speech recognizer 28 may be implemented by any of the well known speech recognition software packages which are commercially available from manufactures such as Dragon Systems, Philips, Lucent and Nuance.

The profile information entered by the service representative, any text data received from the network (e.g., when the subject customer feedback instance is associated with an email message or with data received via a web page), and/or any text data developed by the speech recognizer 28 from voice or other audio data (e.g., when the subject customer feedback instance is associated with a telephone call), is communicated to the data formatter 32. The data formatter 32 writes the received data into appropriate field(s) of a record and the record is stored in the database 16. The record may be operated on at a later time by the database processor 18 as explained below.

FIG. 3 is an exemplary representation of a data structure 40 that may reside in the database 16 and may be filled with records 42 completed by the data formatter 32 of the data acquisition processor 14. The illustrated data structure 40 has a plurality of rows and columns. Each row is associated with a single record 42. Each column is associated with a predefined field. More specifically, the data structure 40 contains a product code field 44 for receiving a code associated with a product discussed in a customer feedback instance, date and time fields 46, 48 for storing data indicating when the customer feedback instance was recorded in the database 16, a reason code field 50 for receiving a code associated with the reason the customer initiated the instance, a comment field 52 for storing any comments that the service representative chooses to enter, and a textual information or customer comment field 54 for storing the text data generated by the speech recognizer 28 or received from the network (e.g., in an email message or web page form), if any.

As shown in FIG. 4, the database processor 18 preferably includes a search engine and queue generator 60, a relevance finder 62, a relevance sorter 64, and a merger 66. Whenever a user initiates a search of the database 16, search criteria are communicated from the GUI of the data analyst terminal 20 to the search engine and queue generator 60. The search engine 60 responds by searching the database 16 for all records meeting the search criteria. For example, search criteria pertaining to product returns for the big button telephone may correspond to R02 and TDG1A for reason code and product code, respectively. If the search engine and queue generator 60 receives such search criteria, it responds by employing conventional word search techniques to search the product code field 44 and the reason code field 50 of every record 42 in the database 16. The records 42 meeting the subject search criteria are compiled and displayed in a search result 70 such as that shown in FIG. 5. The search result 70 is stored in a memory such as the memory associated with the data analyst terminal 20 or the storage device containing the database 16.

Preferably, the search result 70 is composed of a number of rows and columns. Each row represents a record 42 corresponding to a customer feedback instance meeting the search criteria. The columns comprise certain fields from the identified records. Preferably, the displayed fields include at least the fields identified in the search criteria and the comment field 52. In the illustrated example shown in FIG. 5, the product code (USOC) field 44, the reason code field 50 and the comment field 52 of each record 42 meeting the search criteria are displayed. Preferably, the search result 70 also displays the number 74 of records identified in the search (e.g., 919 records). Of course, persons of ordinary skill in the art will appreciate that other fields such as the textual information or customer comment field 54 can be displayed in the search result 70 without departing from the scope or the spirit of the invention.

Returning to FIG. 4, the search result 70 as well as the contents of the entire database 16 are available to the relevance finder 62. As will be discussed in detail with reference to FIG. 10, the relevance finder 62 processes each word in one or more predetermined fields (e.g., the comment field 52) of each record 42 in the search result 70 to generate a search queue 76 (see FIG. 6) that includes a concept list (e.g., a list of every word appearing in the predetermined field(s) of the search result 70). The relevance finder 62 compares each concept 77 in the concept list of the search queue 76 to each word in the predetermined field(s) of every record 42 stored in the entire database 16 to develop a set count for each concept 77 (i.e., the total number of records 42 in the database including a given concept 77 is the set count for that concept). It also compares each concept 77 in the search queue 76 to each word in the predetermined field(s) of the records 42 in the search result 70 to develop a subset count for each concept 77 (i.e., the total number of records 42 in the search result 70 including a given concept 77 is the subset count for that concept). For each concept 77, the relevance finder 62 then employs the set count to calculate a global frequency and the subset count to calculate a local frequency. The global and local frequencies of each concept are then used by the relevance finder 62 to determine a relevance metric (or relevance score) 78 for each concept 77. The relevance finder 62 stores the relevance scores 78 in association with their corresponding concepts 77 in the search queue 76. After relevance scores 78 have been calculated for every concept in the search queue 76, the relevance sorter 64 (FIG. 4) sorts all of the concepts 77 in the search queue 76 according to the magnitudes of their relevance metrics 78. A representative sorted search queue 76 output by the relevance sorter 64 is shown in FIG. 6.

As shown in FIG. 6, each row in the search queue 76 represents a particular concept 77. For instance, in the illustrated example, the first three concepts 77 in the queue 76 are BIG, ENOUGH, and LOUD, all of which are shown in the concept column 98. The search queue 76 also includes relevance 100 and count 102 columns. The relevance column 100 contains the relevance score 78 of each concept 77 listed in the concept column 98. The count column 102 contains a value indicative of the number of records in the search result 70 that include the corresponding concept 77 (i.e., the local record count). For example, the first row in the search queue 76 indicates that the concept BIG appears in forty-one of the records 42 in the search result 70 and that the relevance score 78 of BIG is 0.0832. Because the relevance score 78 is based on a comparison of the frequency with which a particular concept appears in the general population of the database 16 with the frequency with which that concept appears in a subset of that population (i.e., the search result 70), a concept 77 can have a large value in the count column 102 and a low value in the relevance score column 100. For example, although in the example shown in FIG. 6 the concept ENOUGH has a larger count than the concept BIG, it has a lower relevance score 78 than BIG because, while ENOUGH is found in more records 42 in the search result 70 than BIG, the concept ENOUGH also appears in more records in the database 16 than does the concept BIG. The more frequently a concept 77 appears in the records 42 in the search result 70 and the less frequently that same concept 77 appears in the general population of the database 16, the more relevant that concept 77 is to the specified search criteria. In other words, the relevance score 78 of a concept 77 is directly proportional to the number of records 42 in the search result 70 containing that concept 77, and inversely proportional to the number of records 42 in the general population of the database 16 containing that same concept 77. The sorted search queue 76 (FIG. 6) developed by the relevance sorter 64 is communicated to the data analyst terminal 20 for display to the data analyst.

While the sorted search queue 76 shown in FIG. 6 includes only concepts 77 containing a single word, combinations of concepts 77 (which may also be called compound concepts or generically "concepts") may in fact yield relevance metrics 78 that are higher than the relevance metrics 78 of the singular concepts. Accordingly, for the purpose of creating compound concepts (i.e., a string of two or more concepts 77), the database processor 18 is further provided with the merger 66 (see FIG. 4). The merger 66 preferably combines the concepts 77 in the search queue 76 in pairs in every possible, non-redundant way (but without combining more than two concepts (compound or singular) from the existing queue in a single new concept) to create compound concepts. The merger 66 passes the compound concepts to the relevance finder 62, which determines the relevance scores 78 of the compound concepts and communicates the calculated relevance metrics 78 back to the merger 66. If, after the relevance scores 78 of each pair of concepts 77 in the search queue 76 are computed, none of the compound concepts created by the merger 66 in the current merger cycle have a higher relevance metric 78 than the concepts from which they are created (e.g., the relevance score of compound concept BIG, TELEPHONE is not greater than the relevance score of the concept BIG and also greater then the relevance score of the concept TELEPHONE), the merger 66 ceases its operation without changing the search queue 76. If, however, at least one newly created compound concept has a higher relevance score 78 than the concepts 77 from which it was created, the merger 66 cooperates with the relevance sorter 64 to update the search queue 76 to include the newly-created compound concept with the highest relevance score 78 and which meets the above-noted criterion (e.g., has a higher relevance score than any of the singular concepts from which it was created) (see FIG. 7). As used herein, a merger cycle is defined as a cycle wherein a relevance score is computed for every possible combination of two concepts in a search queue as of a fixed time.

The merger 66 continues to merge concepts together until the relevance score 78 of every possible pair of two existing concepts in the search queue 76 (thereby excluding new concepts created in the current merger cycle) is determined. In the example of FIG. 7, the merger 66 has completed one merger cycle on the search queue of FIG. 6 (i.e., every concept in the queue 76 has been paired with every other concept in the queue 76 one time, a relevance score 78 has been computed for each pair, and the new concept with the highest relevance score which is also above the highest relevance score 78 previously contained in the queue 76 has been added to the queue), and the merger 66 has found that the new concept with the highest relevance score, namely, "LOUD, ENOUGH", has a relevance score 78 which is higher than any of the previously calculated relevance scores 78 shown in FIG. 6. Accordingly, the concept "LOUD, ENOUGH" has been added to the search queue 76.

The results of the first merger cycle (FIG. 7) are displayed at the data analyst terminal 20. If the data analyst wishes to initiate another merger cycle, he/she indicates so by interacting with the GUI. The merger 66 responds by pairing each concept 77 in the new search queue 76 with every other concept 77 in that search queue 76, by cooperating with the relevance finder 64 to compute a relevance score 78 for each pair, and by cooperating with the relevance sorter 64 to add the new concept with the highest relevance score 78 to the queue if that score 78 is greater than the highest relevance score 78 in the queue 76 at the end of the last merger cycle. In the example shown in FIGS. 6-8, the performance of a second merger cycle resulted in the addition of the new concept "RING, LOUD, ENOUGH" to the search queue 76 (see FIG. 8). That new concept has a higher relevance score (i.e., 5664.7368) than the concepts from which it was created (i.e., "RING", "LOUD" and "ENOUGH") (FIG. 7).

The results of the second merger cycle (FIG. 8) are displayed at the data analyst terminal 80. If the data analyst requests performance of another merger cycle, the merger 66, the relevance finder 62 and the relevance sorter 64 will function precisely as they did in connection with the second merger cycle described above. The results of a subsequent merger cycle in the illustrated example are shown in FIG. 9. As depicted in that figure, the third merger cycle resulted in the addition of the new concept "DOES, NOT, RING, LOUD, ENOUGH". (Four intervening merger cycles had added four other concepts to the queue 76 shown in FIG. 8, namely, "DOESNT, RING, LOUD, ENOUGH", "STATES, RINGER, LOUD, ENOUGH", "RINGER, NOT, LOUD, ENOUGH", and "LOUD, OF, HEARING, ENOUGH".) The new search queue 76 (FIG. 9) is displayed at the data analyst terminal 20. The data analyst can initiate as many cycles as he/she would like. However, eventually performing additional merger cycles will fail to identify any concept with a relevance score which is higher than the relevance scores of the concepts from which it was created, and additional merger cycles will, therefore, not change the search queue 76.

Persons of ordinary skill in the art will appreciate that, although the above described database processor 18 stops between merger cycles to provide the data analyst with enhanced control over the data analysis process, the merger 66 can be adapted to automatically continue to conduct merger cycles until an interrupt is received from the data analyst terminal 20 or until the search queue 76 is not changed by a merger cycle (whichever occurs first), without departing from the scope or spirit of the invention.

Figure 10:
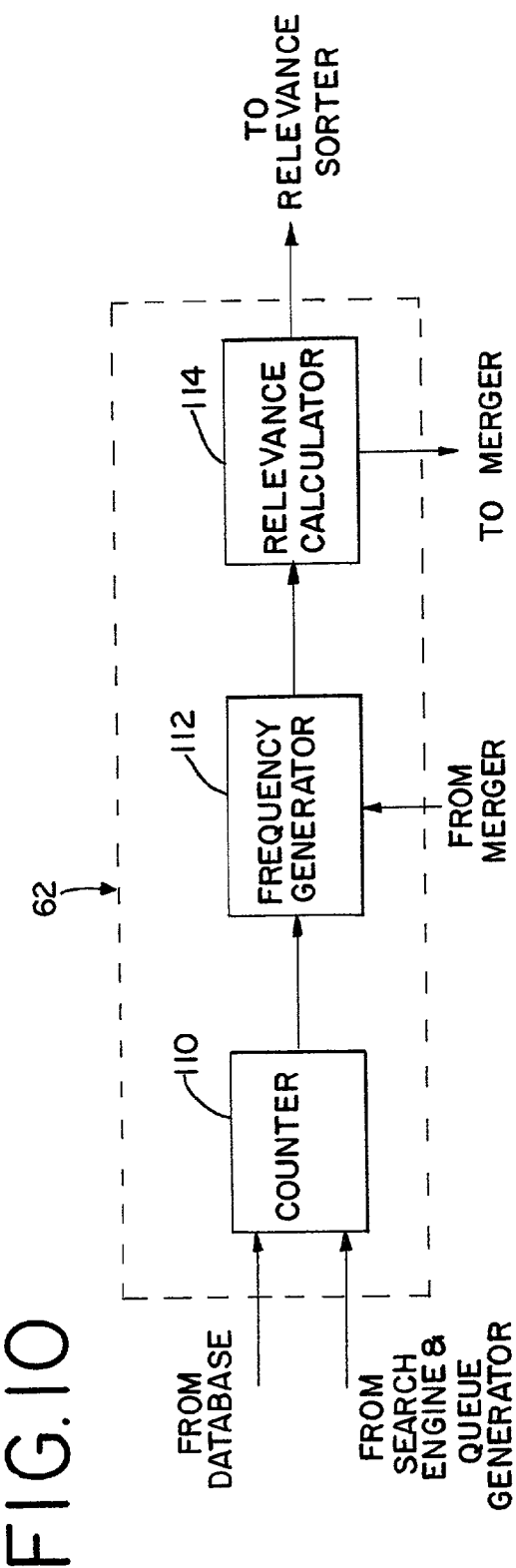
FIG. 10 is a more detailed schematic illustration of the relevance computer of FIG. 4.

Turning to a more detailed discussion of the relevance finder 62, for the purpose of determining the number of records in which a concept 77 appears, the relevance finder 62 is provided with a counter 110 (see FIG. 10). When the search engine and queue generator 60 complete the search result 70, it initiates preparation of the search queue 76 by creating a list of every word/concept found in a predetermined field(s) of every record 42 in the search queue 76. During this process, the counter 110 counts the number of records 42 within which each such word/concept appears. The predetermined field used to create the search queue 76 is preferably the comments field 52, but other fields such as the textual information (customer comments) field 54 could be used in this role either in place of, or in addition to, the comments field 52 without departing from the scope or spirit of the invention. The counter 100 also polls the database 16 to determine how many records 42 within the entire database 16 contain the subject concept/word in the predetermined field(s). Preferably, in addition to the count number, the counter 110 creates a subset list for the search queue identifying by record number (or some other unique identifier) the records 42 containing the subject concept in the subset. The subset list for each concept is stored in association with the corresponding concept. The subset count and set count (i.e., the number of records in the subset (search result 70) and the number of records in the database 16 as a whole containing the concept) are then passed to a frequency generator 112.

The frequency generator 112 calculates a global frequency for each concept 77 by dividing the set count (which is representative of the number of records 42 in the database 16 in which the concept 77 appears) by the total number of records 42 in the database 16. The frequency generator 112 also calculates a local frequency for each concept 77 by dividing the subset count (which is representative of the number of records 42 in the search result 70 in which the concept appears) by the total number of records 42 in the search result 70. Both the global frequency and the local frequency are provided to the relevance calculator 114, which calculates the relevance score 78 of each concept 77 by dividing the local frequency value of the corresponding concept 77 by the global frequency value for that same concept 77. The relevance scores 78 of the concepts 77 are communicated to the relevance sorter 64 shown in FIG. 4 which uses the scores 78 to sort the concepts 77 within the search queue 76.

Figure 11:
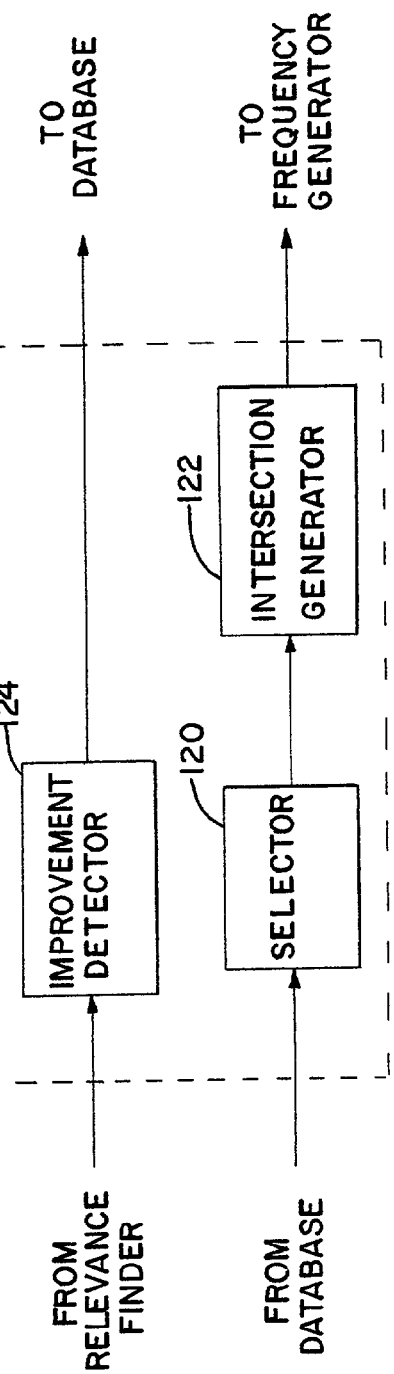
FIG. 11 is a more detailed schematic illustration of the merger of FIG. 4.

A more detailed illustration of the merger 66 is shown in FIG. 11. For the purpose of selecting pairs of concepts 77 in the search queue 76 to create new concepts, the merger 66 is provided with a selector 120. The selector 120 sequentially pairs every concept 77 in the search queue 76 as it existed prior to the current merger cycle with every other concept 77 in that search queue 76 to create new concepts. Each new concept is passed to an intersection generator 122 which determines the number (count) of records 42 within the subset (i.e., the search result 70) that contain the new concept within the predetermined field(s), and the number (count) of records 42 in the database 16 that contain the new concept within the predetermined field(s).

To shorten the processing time required to develop these counts, rather than re-examining all of the records 42 in the search result 70, the intersection generator 122 compares the subset lists created by the counter 110 for the concepts 77 being combined to identify the records 42 containing both concepts. In other words, if, for example, the concepts LOUD and ENOUGH are being combined by the selector 120, the intersection generator 122 retrieves the subset list identifying records within the search result 70 containing the concept LOUD, and the subset list identifying records within the search result 70 containing the concept ENOUGH. It then identifies which (if any) records appears in both subset lists. The number of records 42 appearing in both subset lists define the local record count of the number of records in the search result 70 containing the concept LOUD, ENOUGH. The intersection generator 122 stores the identified count in association with the proposed new concept (LOUD, ENOUGH). It also creates a new subset list identifying (e.g., by record number) the records 42 containing the new concept and stores that new subset list in association with the new concept (LOUD, ENOUGH).

Because the number of records in the database 16 is generally very large, it is impractical to maintain a "set list" (i.e., a list analogous to the subset list but identifying the records in the database 16 as a whole containing a given concept) for each concept. Specifically, both memory and processing time limitations generally preclude the use of such set lists to determine a global record count (i.e., the number of records in the entire database 16 including a given concept) for a concept. The memory limitations are implicated by the length such set lists would often attain. The processing time limitations are implicated by the amount of time it would take to compare such extensively long lists.

To address this problem, and to avoid repeatedly reading every record 42 in the database 16 to develop global record counts, the CFAPS 10 periodically performs an off-line examination of the database 16. Such an examination develops a global index of every single word (i.e., every one word concept 77) appearing in the database 16 and a global record count (i.e., a number indicating the number of records 16 in the database 16 as a whole containing a given concept) for each concept 77. This index is stored in a non-volatile storage medium such as a hard drive where it can be accessed as the need arises.

The global index is utilized to develop approximations of the global frequency (i.e., the global record count divided by the total number of records 42 in the database 16) of each compound concept. In particular, if it is desired to develop a global frequency for the compound concept AB, where concept A and concept B are one word concepts, the relevance finder 62 retrieves the global record counts for concept A and concept B from the global index, and divides those global record counts by the number of records in the database 16 to determine the global frequency for each of concept A and concept B. The frequency generator 112 of the relevance finder 62 then multiplies the global frequencies of concept A and concept B to create an estimated global frequency for the compound concept AB. Were the concepts A and B statistically independent, the estimation would be highly accurate. Since, however, in compound concepts of high relevancy, the underlying concepts will not be statistically independent, multiplying their frequencies will result in a relatively poor estimation of the global frequency of the compound concept. Specifically, in such circumstances, the estimated value will always be lower than the true global frequency. This means that the relevance score of a compound concept including statistically dependent concepts will be higher than the score 78 it would have if the true global frequency of the compound concept was calculated. The enhancement in the relevance score 78 introduced by the noted approximation is reflected in the large relevance scores of the compound concepts appearing in FIGS. 7–9.

It will be appreciated that it will eventually become necessary to compute a relevance score 78 for a new compound concept including one or more compound concepts. In such circumstances, the global index will not have a count for the compound concepts used to build the new current compound concept. Therefore, to calculate the relevance score of the new compound concept, the relevance finder 62 employs the estimated value(s) of the compound concept(s) used to build the new compound concept. For example, if new compound concept ABCD is made from compound concept AB and compound concept CD, the estimated global frequency of the compound concept AB is multiplied with the estimated global frequency of the compound concept CD to determine an estimated global frequency for the compound concept ABCD.

The subset count (local record count) determined by the intersection generator 122 is communicated to the frequency generator 112 which then calculates a local frequency as explained above (see FIG. 10). (The local frequency equals the subset count divided by the total number of records 42 in the search result 70.) The relevance calculator 114 then develops a relevance score 78 for the new concept from the global frequency and the local frequency as described above. The relevance score 78 is returned to the improvement detector 124 of the merger 66 (see FIG. 11).

The improvement detector 124 compares the relevance score 78 received from the relevance calculator 114 for the new concept being tested to the highest relevance score 78 obtained by a new concept in the current merger cycle thus far. If it does not have the highest relevance score 78 of any concept created in the current merger cycle, it is discarded and the next new concept 77 is tested. This process continues until the improvement detector 124 identifies the concept with the highest relevance score 78 created during the current merger cycle. The improvement detector 124 then compares the relevance score 78 of that compound concept (i.e., the new concept developed in the current merger cycle) to the relevance score 78 of each concept forming the new compound concept. If the relevance score 78 of the new concept developed in the current merger cycle is lower than any one of the relevance scores of the concepts forming the new compound concept, no additional concept is added to the queue 76. Otherwise, the new concept is added to the search queue 76 in the appropriate position indicated by its relevance score 78 (i.e., at the highest position).

Persons of ordinary skill in the art will appreciate that, while the intersection generator 122 is preferably included to reduce processing time, if desired the intersection generator 122 can be eliminated and the output of the selector 120 delivered to the counter 110 of the frequency finder 62 (instead of the frequency generator 112) to initiate a full examination of all of the records in the search result 70 without departing from the scope or spirit of the invention. Similarly, persons of ordinary skill in the art will appreciate that the approximation technique for calculating the global frequency of compound concepts described above can be replaced with a brute force counting technique or with a "set list" technique analogous to the subset list technique described above without departing from the scope or spirit of the invention.

Persons of ordinary skill in the art will also appreciate that, although in the preferred embodiment, the search queue 76 is developed from the comment fields 52 of the records in the search result 70, the search queue 76 could alternatively (or additionally) be developed from the textual information fields 54 of the records without departing from the scope or spirit of the invention. Use of the comment fields 52 for queue generation is preferred, however, because they are believed to typically contain much of the same information as the textual information fields 54, but in condensed fashion. As a result, using the comment fields 52 should reduce processing time.

A more detailed explanation of the structure and operation of the software implementing the preferred embodiment of the CFAPS 10 will now be provided in connection with the flow charts appearing in FIGS. 12–17. Persons or ordinary skill in the art will appreciate that, although for ease of discussion, the structure and operation of the software will be described in the context of a series of steps occurring in a particular order, the steps or variations thereof can be performed in other temporal sequences without departing from the scope or spirit of the invention.

Figure 12A:
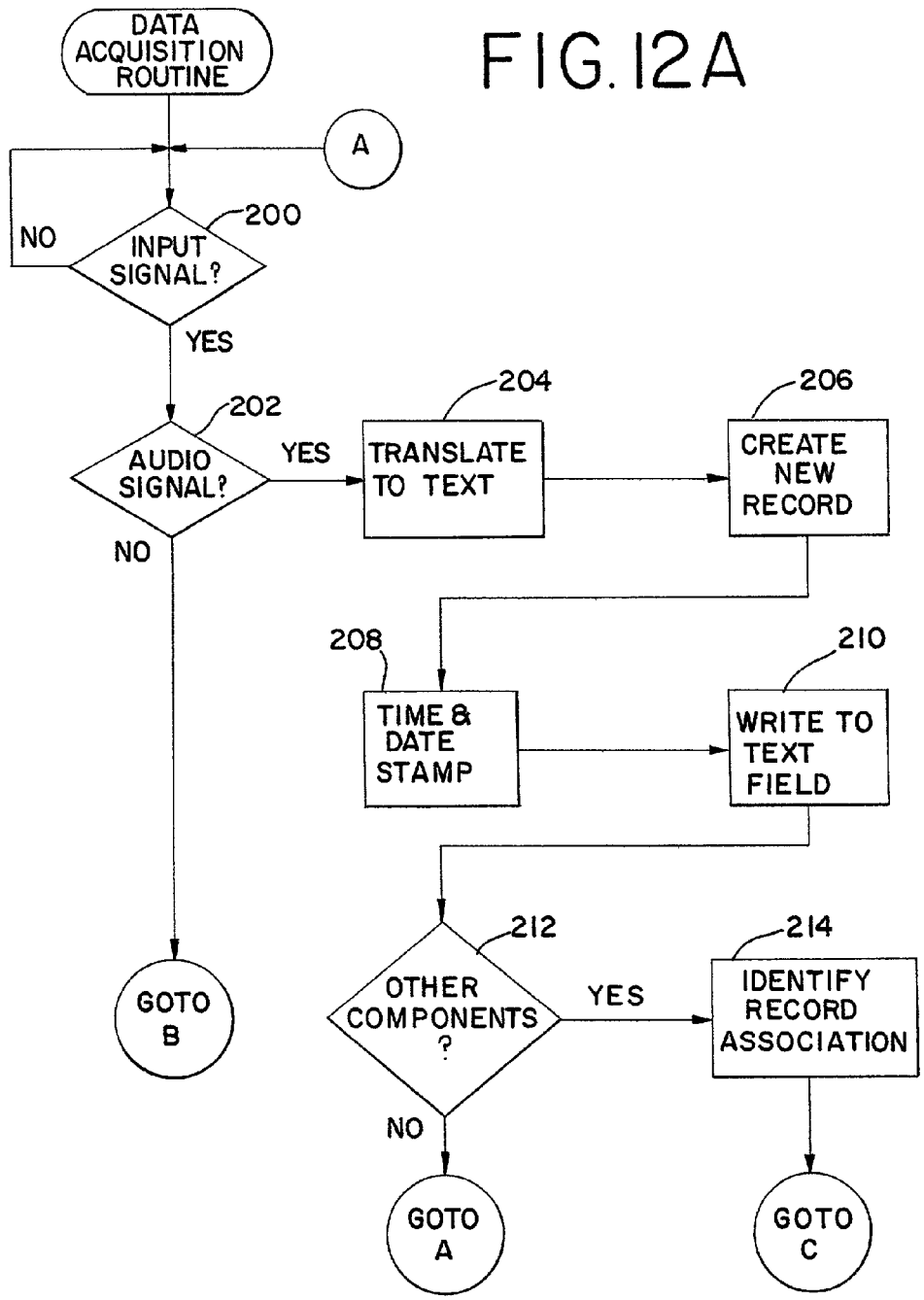
FIGS. 12A–12D are a flowchart illustrating exemplary programmed steps performed by the data acquisition processor of FIG. 1.

Turning first to the steps executed by the data acquisition processor 14 (FIG. 12A), the data acquisition processor 14 initially awaits receipt of a customer feedback input message from a service representative terminal 12 (block 200). Upon receipt of an input message, the signal identifier 25 (FIG. 2) examines the input message to determine if it includes an audio signal (block 202). If so, the audio signal is routed to the speech recorder 26. The speech recognizer 28 then translates the audio signal to text and delivers the text to the data formatter 32 (block 204). Since an input message with an audio component (e.g., a recording of a telephone call) will always be associated with a new customer feedback instance, the data formatter 32 creates a new record 42 in the database 16, (block 206), fills in the date and time fields 46, 48 of the new record 42 with the current date and time (block 208) and then writes the text received from the speech recognizer 28 in the textual information field 54 of the new record (block 210). If the input message including the audio signal also included non-audio components (block 212), the non-audio portion(s) are stamped with an identifier referencing the newly created record 42 (block 214), and then control proceeds to block 230 (FIG. 12C). Otherwise, control returns to block 200 until another input signal is received.

Figure 12B:
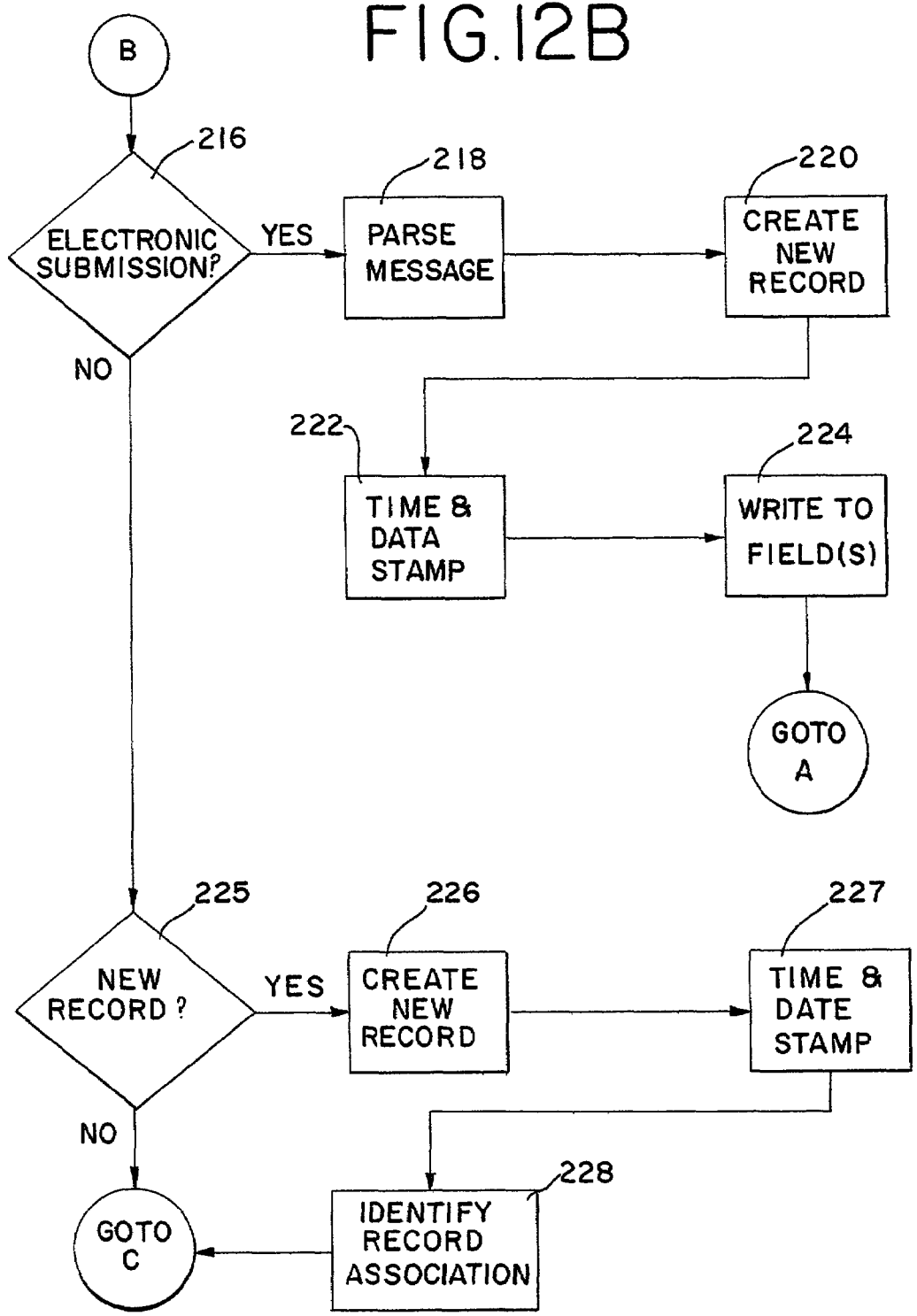
Figure 12C:
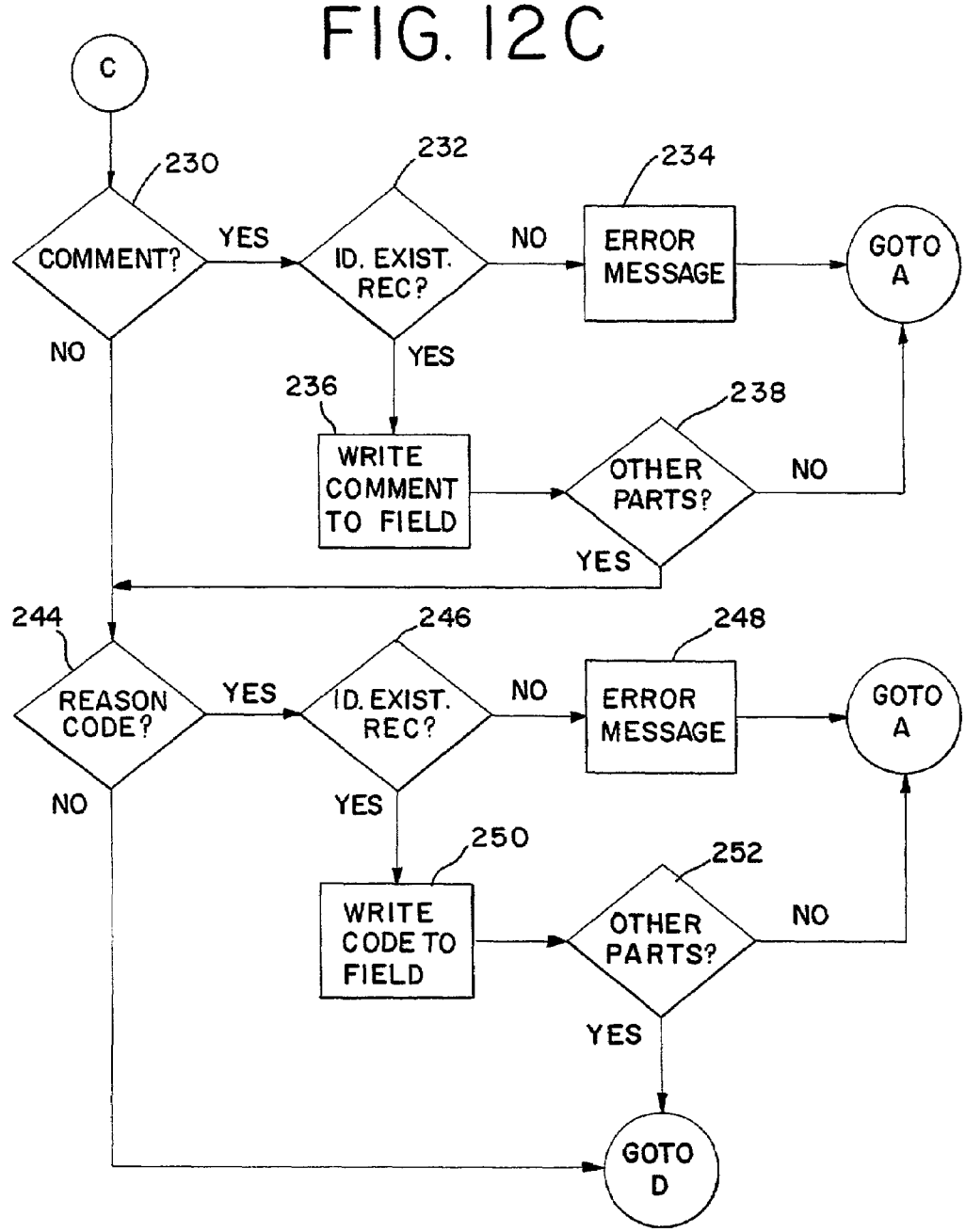

If the input message did not include an audio signal (block 202), control proceeds to block 216 (FIG. 12B). If the data formatter 32 identifies the received input message as an electronic submission such as a web page form or an email message (block 216), it attempts to identify any predefined codes within the message that would divide the message into segments (e.g., a product code segment, a reason code segment, a service representative comment segment, and/or a customer feedback text segment (block 218). Since an electronic submission is always associated with a new customer feedback instance, the data formatter 32 creates a new record 42 in the database (block 220). It then records the current date and time in the date and time fields 46, 48 of the new record 42 (block 222). The data formatter 32 then writes any identified segment(s) of the input message to the corresponding field(s) in the new record (block 224). Any unidentifiable text in the input message (e.g., text without a code such as might be present in an email message) is written to the textual information field 54 of the new record (block 224). Control then returns to block 200 (FIG. 12A).

To handle customer feedback instances that are not accompanied by an audio recording and are not originated by electronic submission, the service representatives are provided with the ability to request creation of a new record. When such a request is received (block 225), the data formatter 32 creates a new record 42 in the database 16, records the current date and time in the date and time fields 46, 48 of the new record 42 (block 227), and stamps the input message with an identifier associating the message with the newly crated record 42 (block 228). Control then proceeds to block 230 (FIG. 12C).

If the received input message does not include an audio component (block 202), does not request creation of a new record 42 (block 225), is not an electronic submission (block 216), or does include an audio component in addition to other components (block 212), control proceeds to block 230. If the input message includes a code identifying the message (or a portion thereof) as a service representative comment, control proceeds to block 232. If the input message does not identify the comment as being associated with an existing record 42, an error message is sent to the service representative terminal 12 originating the input message (block 234). Control then returns to block 200 for processing of the next received message.

If, on the other hand, the input message associated with the comment does identify an existing record 42 (block 232), the data formatter 32 writes the comment to the comment field 52 of the identified record 42 (block 236). If the input message includes additional components (block 238), control proceeds to block 244. Otherwise control returns to block 200 for processing the next input message (which, of course, may optionally be waiting in a message queue).

If, at block 230, the data formatter 32 determines that the input message does not include a comment portion, or if, after processing an input message including a comment portion, additional components of the input message remain for processing (block 238), control proceeds to block 244. At block 244, the data formatter 32 determines whether the input message includes a code identifying the message (or a portion thereof) as a reason code. If so, control proceeds to block 246. If the input message does not identify an existing record 42, the data formatter 32 returns an error message to the service representative terminal 12 originating the message (block 248). Control then returns to block 200.

Figure 12D:
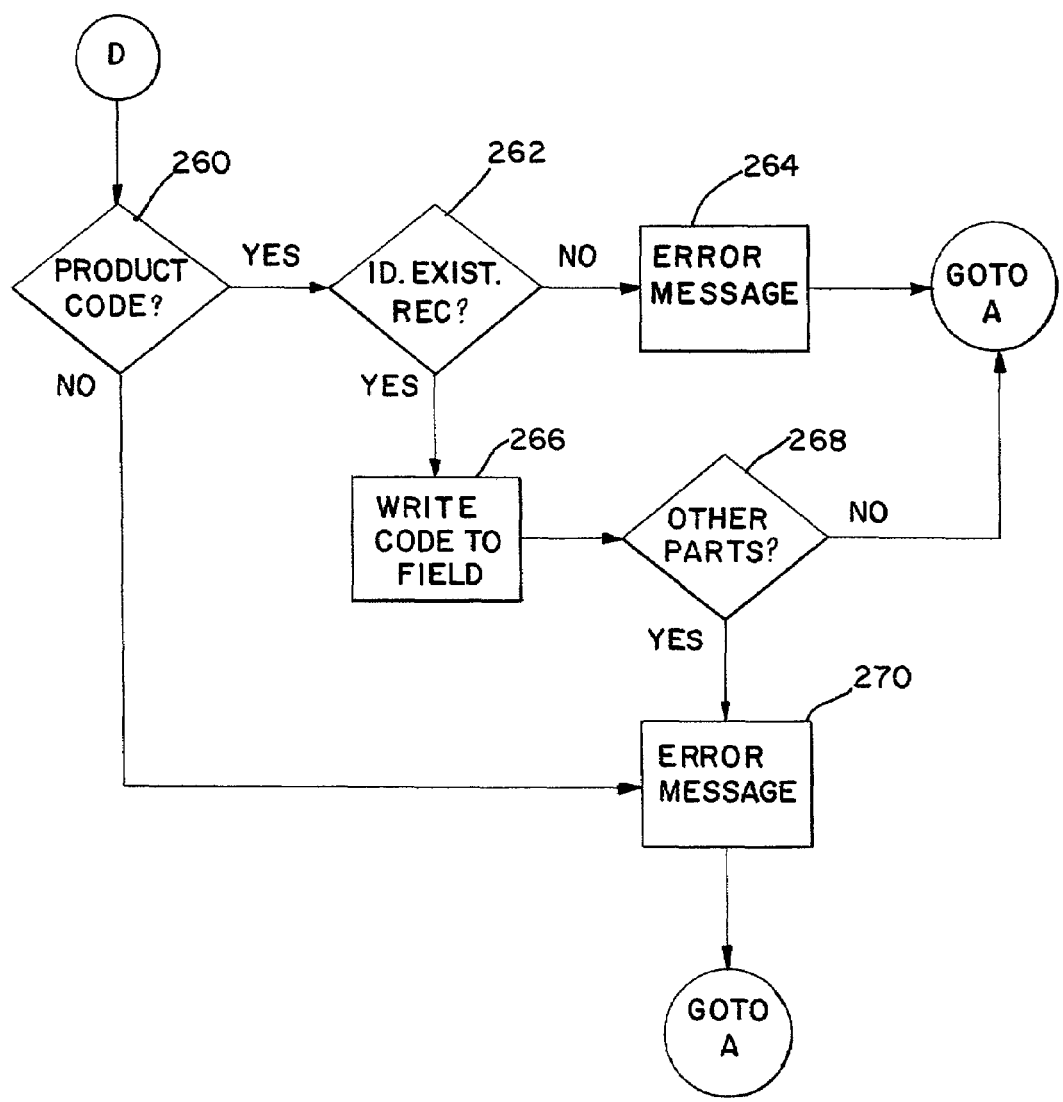

If, on the other hand, the input message does identify an existing record (block 246), the data formatter 32 writes the reason code associated with the input message into the reason code field 50 of the identified record 42 (block 250). If the input message includes additional components (block 252), control proceeds to block 260 (FIG. 12D). Otherwise, control returns to block 200.

If, at block 244, the date formatter 32 determines that the input message does not include a reason code, or if after processing an input message including a reason code, additional components of the input message remain for processing (block 252), control proceeds to block 260. If, at block 260 (FIG. 12D), the data formatter 32 determines that the input message includes a code identifying the message (or a portion thereof) as a product code, control proceeds to block 262. If the input message does not identify an existing record 42 (block 262), the data formatter 32 returns an error message to the service representative terminal 12 originating the message (block 264). Control then returns to block 200.

If, on the other hand, the input message does identify an existing record (block 262), the data formatter 32 writes the product code associated with the input message into the product code field 44 of the identified record 42 (block 266). If the input message includes remaining, unprocessed components, those components are unidentifiable and the data formatter 32 sends an error message to the originating service representative terminal 12 (block 270). Otherwise, control returns to block 200.

Similarly, if at block 260, the data formatter 32 determines that the input message does not include a product code, the input message is unidentifiable and the data formatter 32 returns an error message to the service representative terminal 12 originating the message (block 270). Control then returns to block 200.

The operation of the database processor 18 will now be explained in connection with FIGS. 13–18.

Figure 13A:
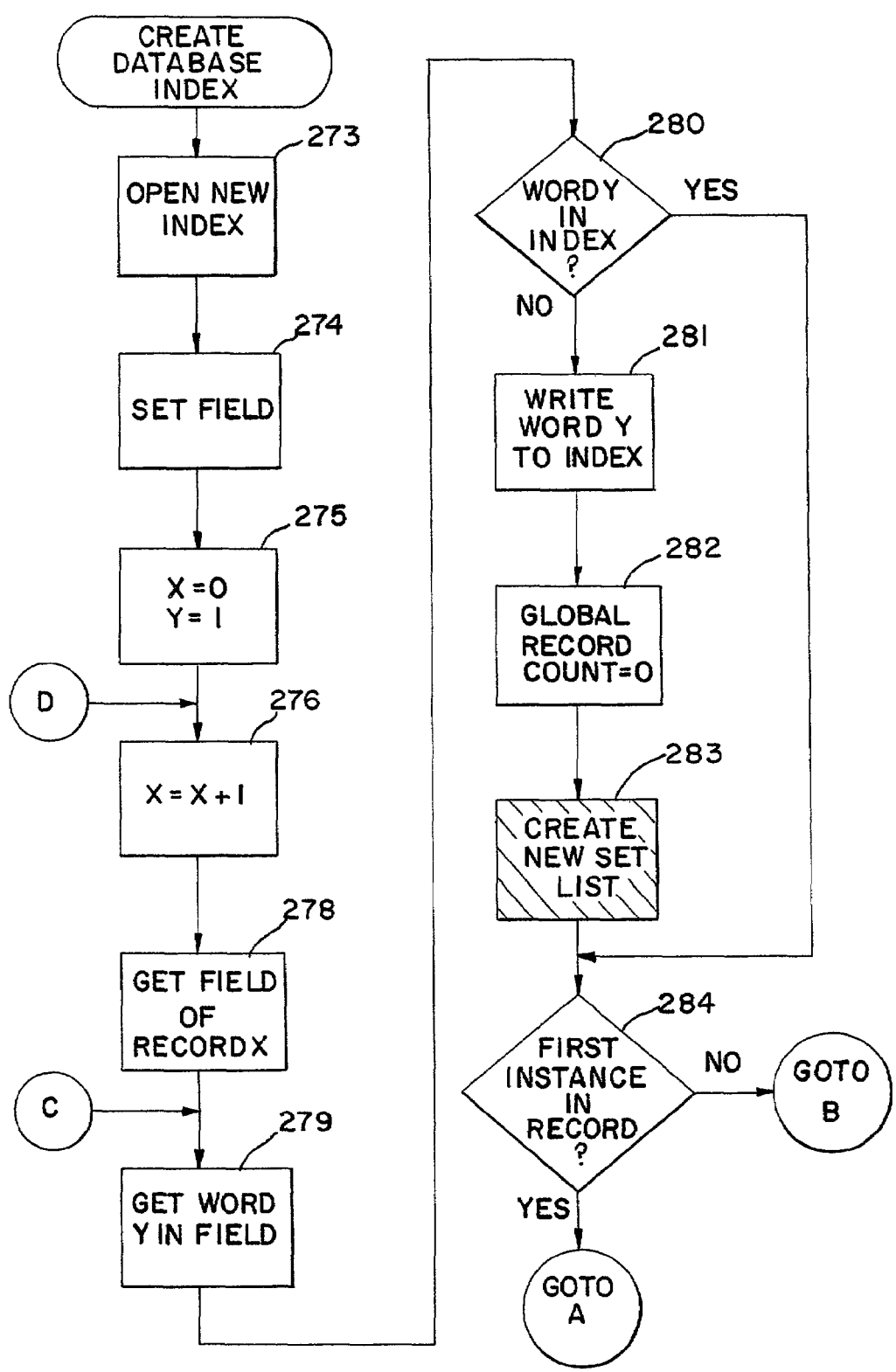
FIGS. 13A–13B are a flowchart illustrating an exemplary create database index routine.
Figure 13B:
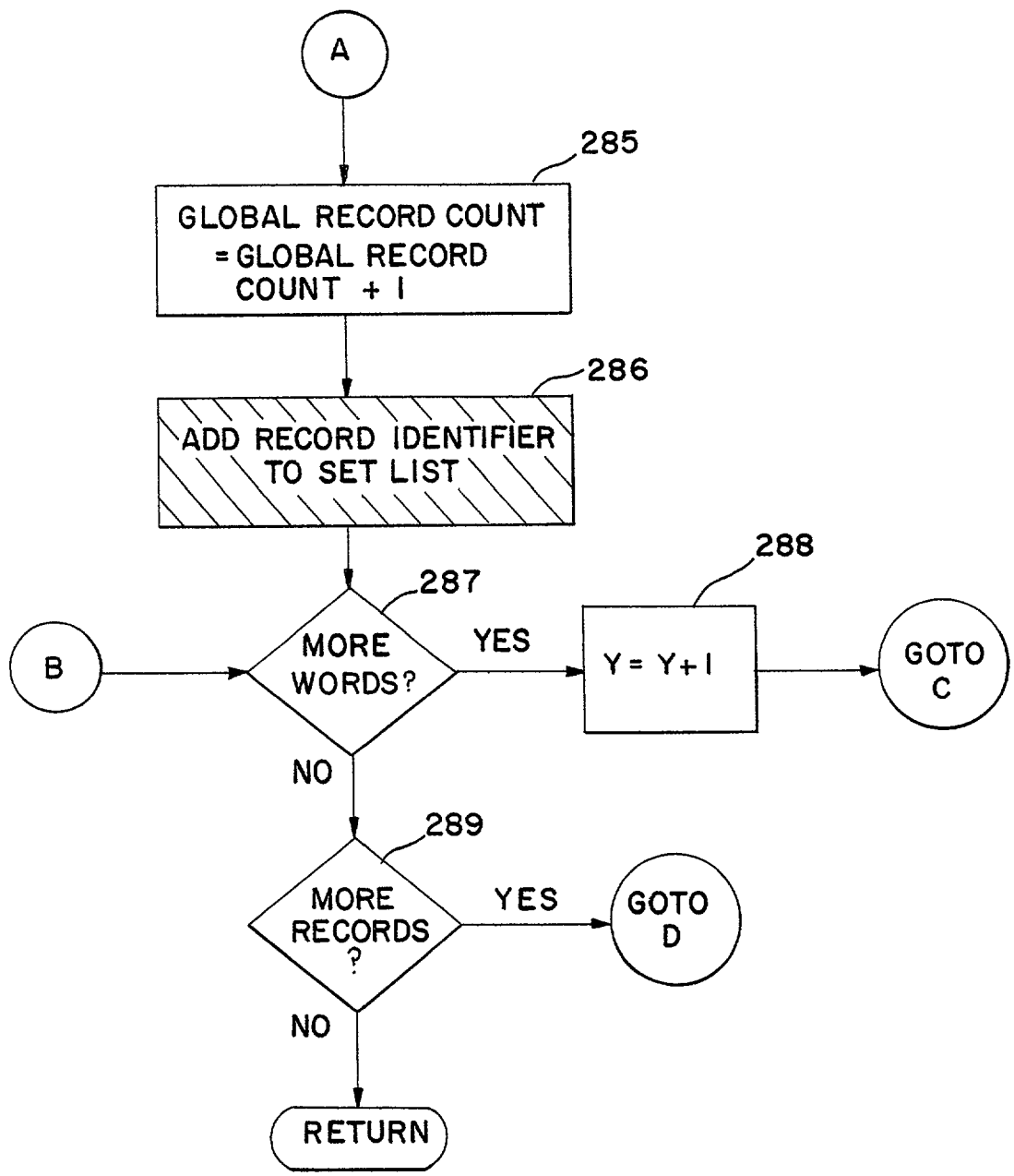

The create database index routine is shown in FIGS. 13A–13B. Although the index is not shown in the figures, the create database index routine is executed to create an index of every one word concept in the predefined field(s) of the records 42 in the entire database 16. This index identifies each such one word concept and its corresponding global record count. As explained above, the information contained in the index is used in estimating the global frequency of compound concepts. The presence of the index (which is typically stored on a hard drive) expedites the operation of the rest of the program by eliminating the need to repeatedly poll the database 16 to determine global record counts. If the database 16 is updated from time to time, it is also necessary to periodically update the index by, for example, re-executing the create database index routine to create a new index.

When the create database index routine is initiated, the search engine and queue generator 60 creates a new index in a non-volatile memory such as a hard drive associated with the data analyst terminal 20 or the storage device containing the database 16 (block 273). The search engine and queue generator 60 then determines which field(s) of the records 42 in the database 16 are to be used to create the index (block 274). As mentioned above, the field(s) employed in this role is typically the comment field 52 alone. However, other fields including, by way of example, not limitation, the textual information field 54, could be used in place of, or in addition to the comment field 52 without departing from the scope or spirit of the invention.

As shown in FIG. 13A, after the field to be used in generating the index is identified (block 274), the search engine and queue generator 60 sets a record counter X to zero and a word counter Y to one (block 275). The record counter X is then incremented by one (block 276) and the field identified at block 274 is retrieved from the first record in the database 16 (block 278). A first word in the retrieved field is then selected (block 279) and examined to determine if the selected word already appears in the index (block 280). If the selected word is not in the index (block 280), the search engine and queue generator 60 writes that word to the index (block 281) and sets a word count variable associated with the newly added word (concept) to one (block 282). Although, due to the memory and processing constraints mentioned above it is not done in the currently preferred embodiment, a set list could optionally be created (block 283). Control then proceeds to block 284. If the word selected at block 279 is already in the index (block 280), control passes directly to block 284 from block 280.

At block 284, the search engine and queue generator 60 determines whether the current word has already been seen in the current record 42. If this is the first instance of the word (concept) 77 appearing in the current record, then the global record count for the current word is incremented by one (block 285) (FIG. 13B). If a set list is being created, an identifier identifying the current record is written to the set list (block 286). If this is not the first time the word 77 has been seen in the current record, control proceeds to block 287. Block 284 is provided to ensure that the global record count for the concepts 77 written to the index reflect the number of records 42 in which that concept 77 appears, not the total number of times that the concept 77 appears in the database 16 (e.g., if the word "BIG" appears twice in one record, the global record count for the word "BIG" will only be incremented by one).

At block 287 (FIG. 13B), the search engine and queue generator 60 determines whether the current word is the last word in the field of the current record. If not, the word counter Y is incremented by one (block 288) and control returns to block 279 (FIG. 13A). Control will continue to loop between blocks 279–288 until each word in the field of the current record is examined. After each word in the current record has been examined (block 287), the search engine and queue generator 60 determines whether there are more records 42 in the database 16 to examine (block 289) (FIG. 13B). If so, control returns to block 276 (FIG. 13A). Control will continue to loop through blocks 276–289 until every word and every record 42 in the index has been examined. When that examination is complete (block 289), the index will be complete. Every single word concept in the database can be looked up in the completed index to identify a global record count for the looked-up word.

Figure 14A:
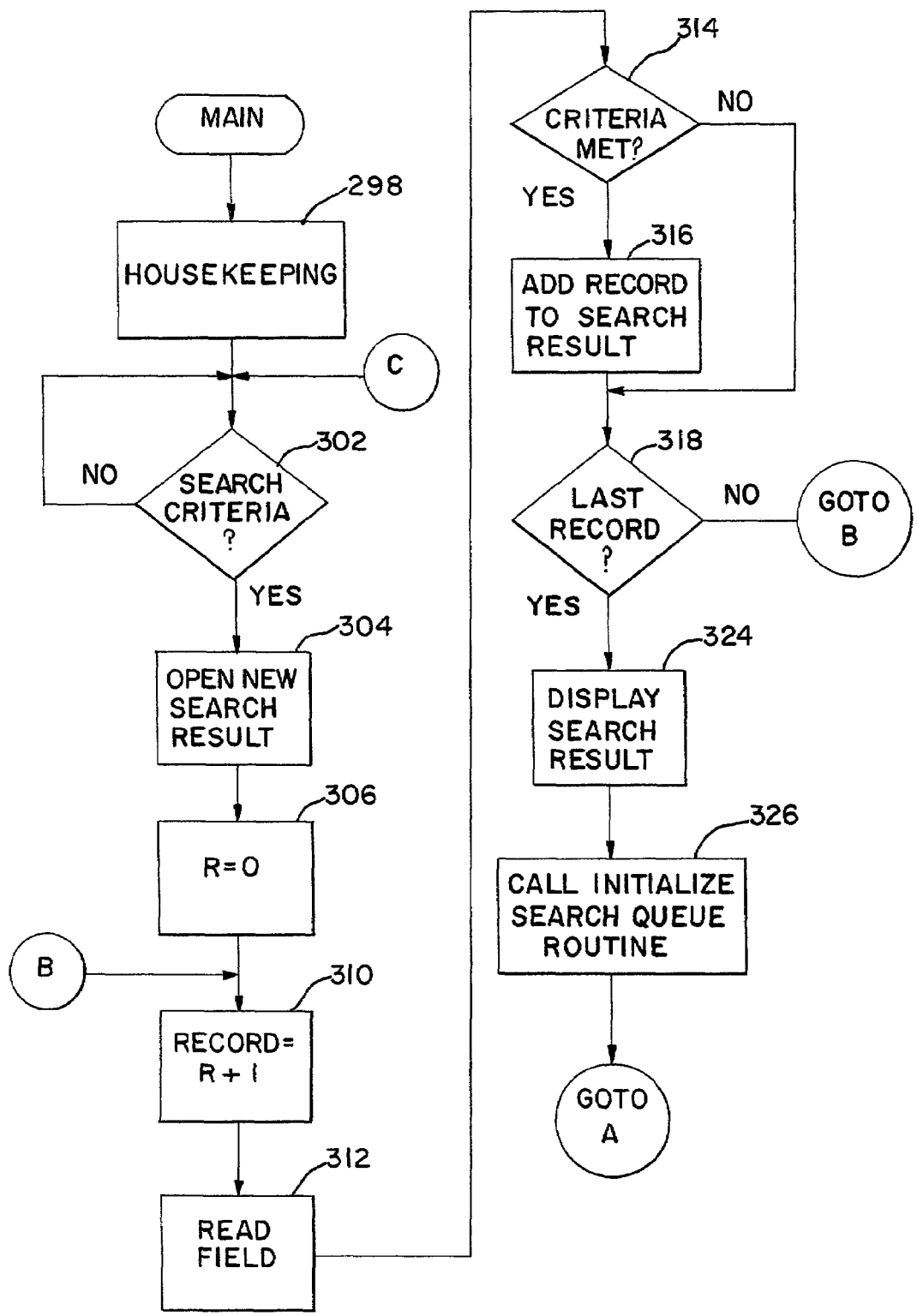
FIGS. 14A–14B are a flow chart illustrating an exemplary main routine implemented by the database processor of FIG. 1.
Figure 14B:
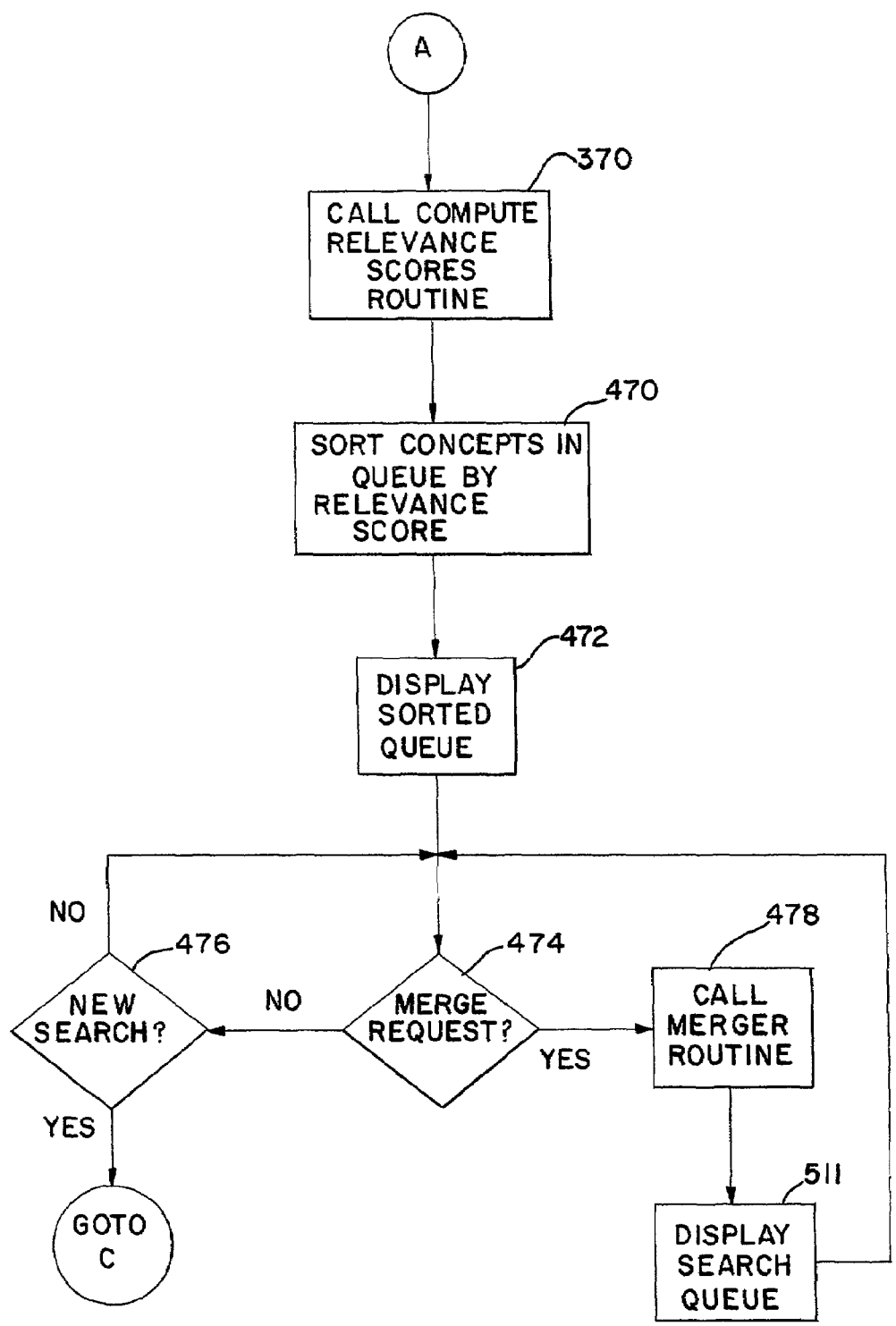

The main routine executed by the database processor 18 is shown in FIGS. 14A–14B. As shown in FIG. 14A, at startup, the database processor 18 performs various conventional housekeeping tasks such as initializing variables (block 298). After the housekeeping tasks are completed, control proceeds to blocks 302.

At block 302, the database processor 18 enters a loop wherein it awaits entry of search criteria from a data analyst terminal 20. When search criteria are received, the search engine and queue generator 60 (FIG. 4) creates a data structure in an associated memory (such as the memory of the data analyst terminal 20 or the memory device containing the database 16) to store a new search result 70 (block 304). It then clears a record counter R (block 306), and then enters a loop defined by blocks 310–318 to populate the newly defined search result 70.

In particular, at block 310, the search engine and queue generator 60 increments the record count by one. It then retrieves the record (or a portion thereof) associated with the record count from the database 16 and reads a predefined field from that record 42 (block 312). The predefined field is identified in the search criteria entered by the user, and may comprise the product code field 44, the date field 46, the time field 48, the reason code field 50, the comments code field 52, and/or the textual information field 54. In the example shown in FIG. 5, the predetermined fields are the product code field 44 and the reason code field 50.

After the predetermined field is read (block 312), the search engine and queue generator 60 determines whether the search criteria specified by the data analyst are met in that field (block 314). This determination is preferably performed by comparing a term entered by the data analyst against the term(s) contained in the predetermined field(s). If a match is found, the criteria are met and control proceeds to block 316. Otherwise, the search criteria are not met and control proceeds to block 318. If the search criteria are met (block 314), the search engine and queue generator 60 adds the record 42 being examined to the newly defined search result 70 (block 316). The search engine and queue generator 60 then determines whether the record 42 currently being examined is the last record 42 in the database 16 (block 318). If not, control returns to block 310 where the record count is incremented and the next record 42 is retrieved for comparison against the search criteria. Control will continue to loop through blocks 310–318 until every record 42 in the database 16 is examined for compliance with the search criteria. After every record 42 is so examined, the search result 70 (see FIG. 5) is displayed at the data analyst terminal 20 (block 324). The search engine and queue generator 60 then calls the initialize search queue routine shown in FIGS. 15A–15B (block 326).

When the initialize search queue routine is initiated, the search engine and queue generator 60 creates a new search queue 76 in a memory such as the memory associated with the data analyst terminal 20 or the storage device containing the database 16 (block 330). The search engine and queue generator 60 then determines which field(s) of the records 42 in the search result 70 are to be used to create the search queue 76 (block 332). As mentioned above, the field employed in this role is typically the comment field 52 alone. However, any other field(s) including, by way of example, not limitation, the textual information field 54, could be used in place of, or in addition to, the comment field 52 without departing from the scope or spirit of the invention.

After the field to be used in generating the search queue 76 is identified (block 332), the search engine and queue generator 60 sets a record counter X to zero and a word counter Y to one (block 334). The record counter X is then incremented by one (block 336) and the field identified at block 332 is retrieved from the first record in the search result (block 338). A first word in the retrieved field is then selected (block 340) and examined to determine if the selected word already appears in the search queue 76 (block 342). If the selected word is not in the search queue 76 (block 342), the search engine and queue generator 60 writes that word to the search queue 76 and sets a word count variable (i.e., the local record count) associated with the newly added word (concept) to zero (block 346). It then creates a subset list for the new concept (block 347). Control then proceeds to block 348. If the word selected at block 340 is already in the search queue 76 (block 342), control passes directly to block 348.

Figure 15A:
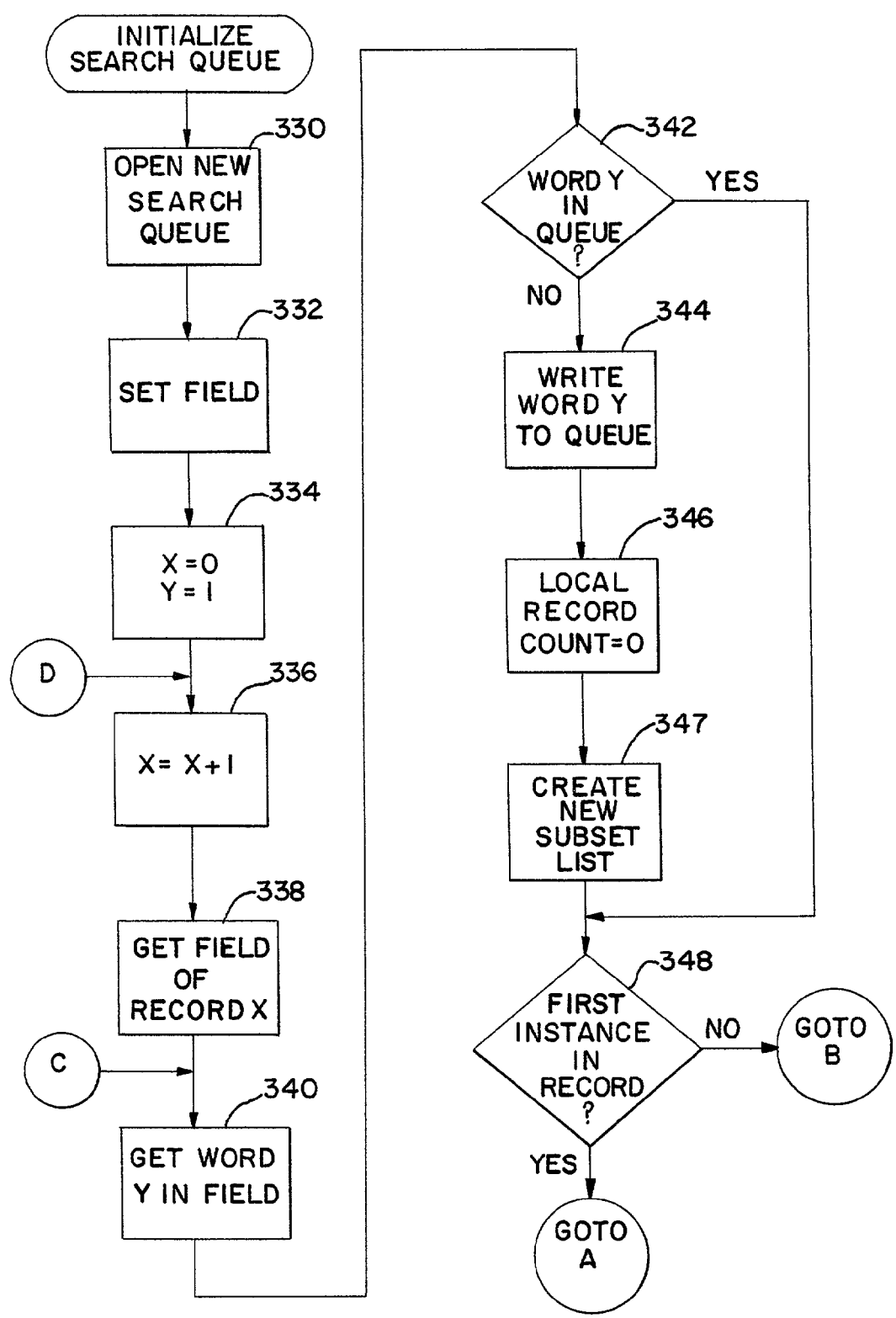
FIGS. 15A–15B are a flow chart illustrating an exemplary initialize search queue routine called by the main routine of FIGS. 14A–14B.
Figure 15B:
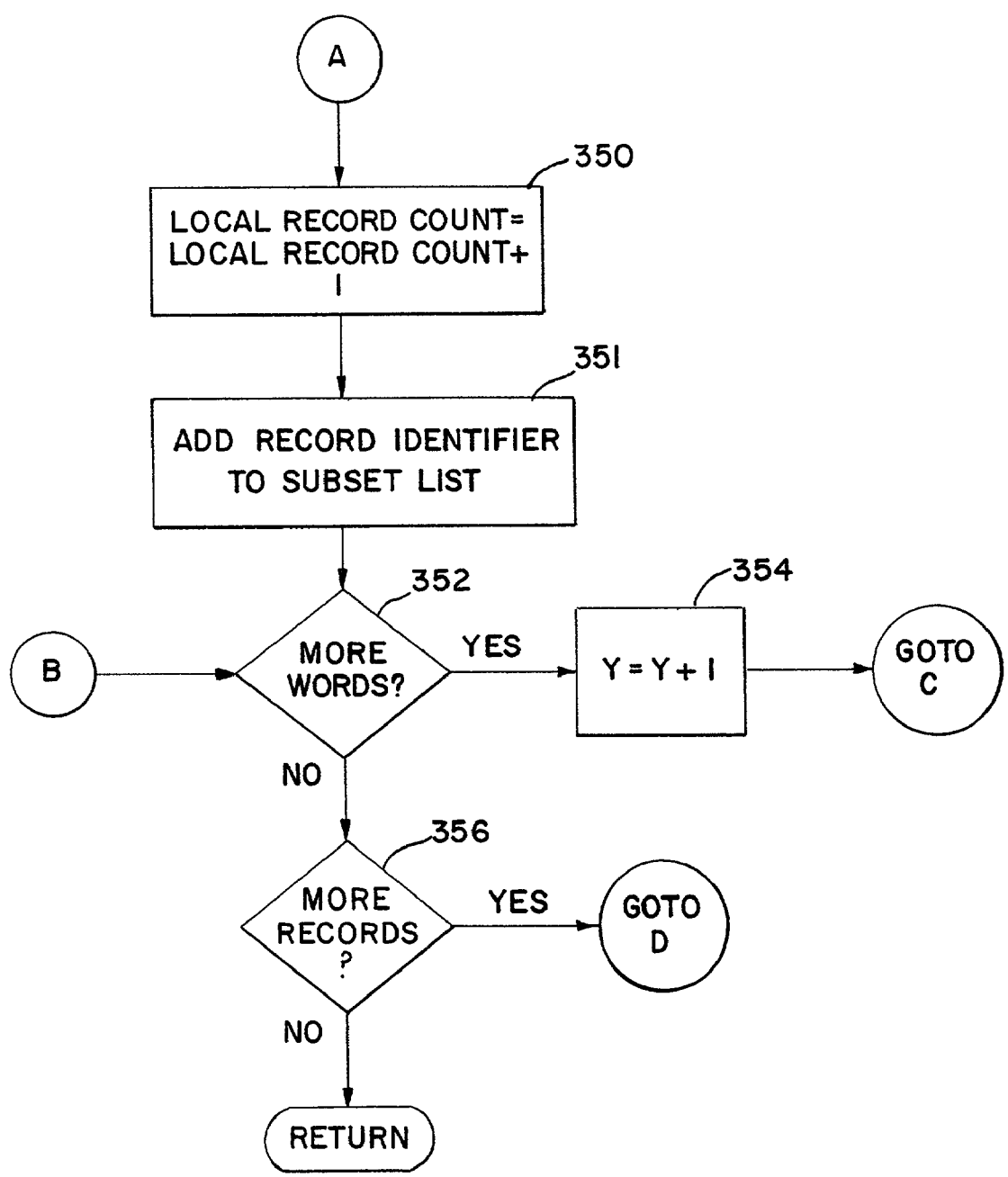

At block 348, the search engine and queue generator 60 determines whether the current word has already been seen in the current record 42. If this is the first instance of the word (concept) 77 appearing in the current record, then the local record count for the current word is incremented by one (block 350) and the identifier of the record being examined is added to the subset list (block 351). If this is not the first time the word has appeared in the current record 42, control proceeds to block 352 (FIG. 15B). Block 348 is provided to ensure that the local record count for the concepts 77 written to the search queue 76 reflect the number of records in which that concept 77 appears, not the total number of times that concept 77 appears in the search result 70 (e.g., if the word "BIG" appears twice in one record, the local record count for the word "BIG" will only be incremented by one).

At block 352 (FIG. 15B), the search engine and queue generator 60 determines whether the current word is the last word in the field of the current record. If not, the word counter Y is incremented by one (block 354) and control returns to block 340 (FIG. 15A). Control will continue to loop between blocks 340-354 until each word in the field of the current record is examined. After each word has been examined (block 352), the search engine and queue generator 60 determines whether there are more records 42 in the search result 70 to examine (block 356) (FIG. 15B). If so, control returns to block 336 (FIG. 15A). Control will continue to loop through blocks 336-356 until every word in every record 42 in the search result 70 has been examined. When that examination is complete (block 356), the concept list 98 and local record count column 102 of the search queue 76 will be complete and control will return to block 370 of the main routine (FIG. 14B).

Figure 16:
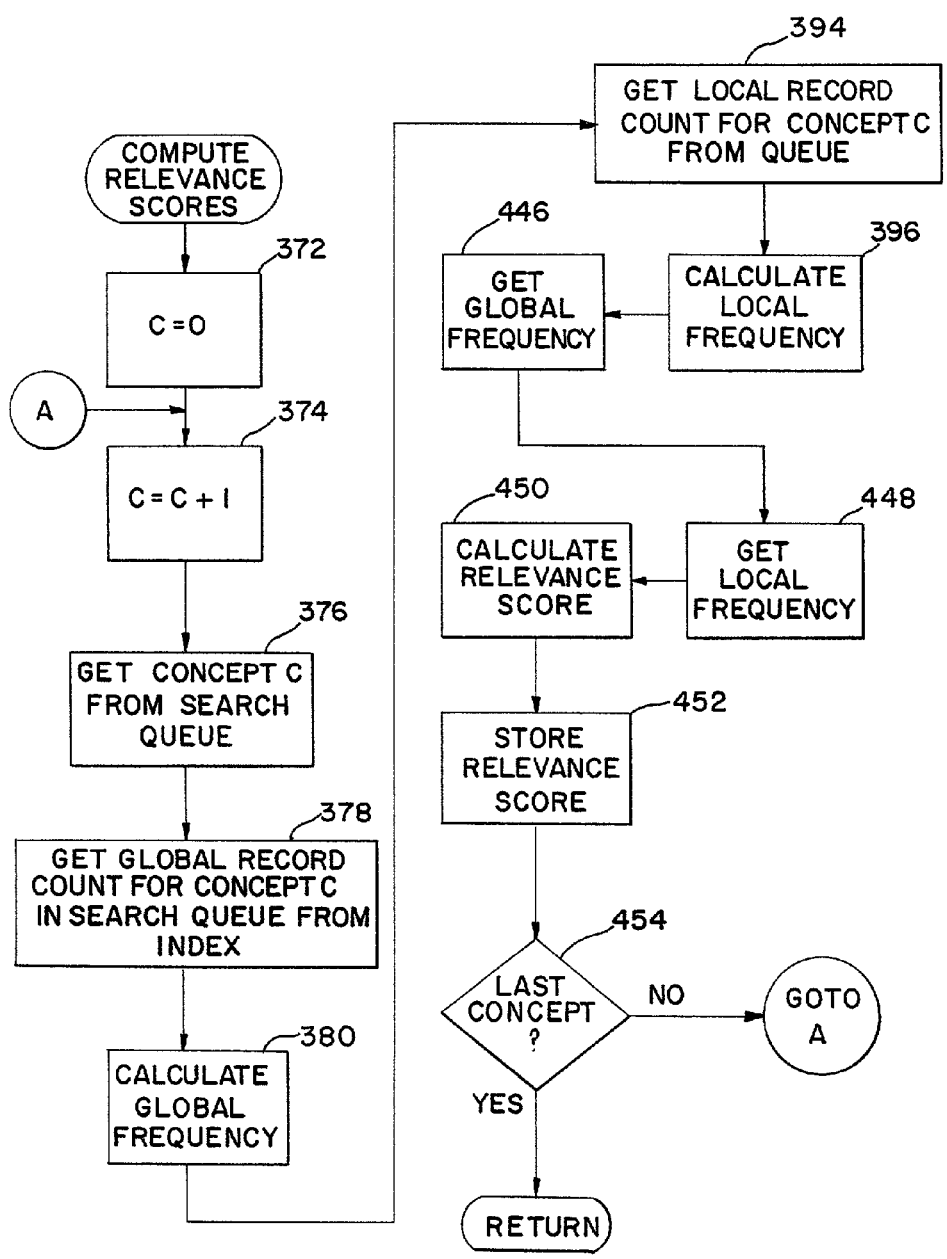
FIG. 16 is a flow chart illustrating an exemplary compute relevance scores routine called by the main routine of FIGS. 14A–14B.

Once the search queue 76 has been populated with the concept list 98 and the local record counts list 102, the search engine and queue generator 60 calls the compute relevance scores routine (block 370). As shown in FIG. 16, the counter 110 of the relevance finder 62 initiates the compute relevance scores routine by setting loop counter C to zero (block 372). The loop counter C is then incremented by one (block 374). The first concept in the search queue 76 is then retrieved (block 376). The counter 110 then retrieves the global record count for the first concept in the search queue 76 from the index (block 378). The frequency generator 112 then calculates and stores the global frequency for the current concept by dividing the global record count (i.e. the number of records in the database 16 that include the current concept) by the total number of records 42 in the database 16 (block 380).

The counter 110 of the relevance finder 62 then retrieves the local record count for the first concept in the search queue 76 (block 394). The frequency generator 112 then calculates the local frequency for the current concept by dividing the local record count by the number of records in the search result (block 396) (FIG. 16). The relevance calculator 114 then retrieves the global frequency and the local frequency for the concept identified at block 444 (blocks 446–448). The relevance calculator 114 then calculates a relevance score 78 for the current concept by dividing its global frequency by its local frequency (block 450). The relevance calculator 114 then stores the calculated relevance score 78 in the search queue 76 in association with the current concept (block 452). The relevance calculator 114 next determines whether the relevance score 78 for the last concept in the search queue 76 has been written to the search queue 76 (block 454). If not, control returns to block 374. Control will continue to loop through blocks 374–454 until the relevance score 78 of every concept 77 in the search queue 76 has been calculated and written to the search queue 76. After the relevance score 78 of the last concept 77 in this search queue 76 has been calculated (block 454), control returns to block 470 of the main routine shown in FIG. 14B.

At block 470, the relevance sorter 64 sorts the concepts 77 in the search queue 76 based on their relevance scores 78 using a conventional sorting algorithm such as a bubble sort routine. The database processor 18 then displays the sorted search queue 76 (see FIG. 6) at the data analyst terminal 20 (block 472).

The database processor 18 then enters a loop where it awaits a request to perform a merger cycle (block 474) or a request to initiate a new search (block 476) from the data analyst. If the data analyst requests that a new search be performed (block 476), control returns to block 302 of FIG. 14A where the data analyst is given the opportunity to enter new search criteria. If, on the other hand, the data analyst requests the initiation of a merger cycle (block 474), control proceeds to block 478 (FIG. 14B) where the database processor 18 calls the merger routine.

Figure 17A:
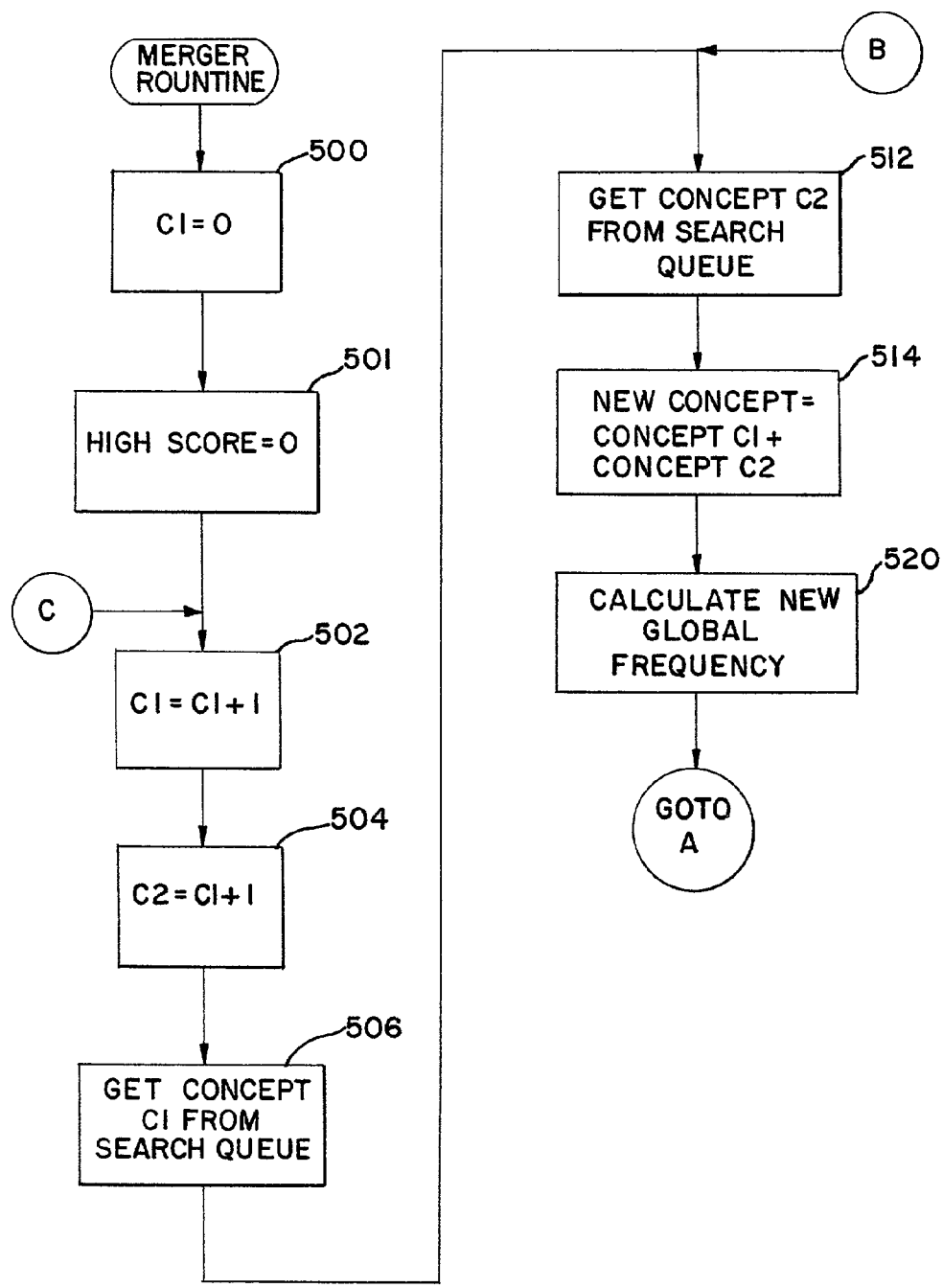

As shown in FIG. 17A, the selector 120 of the merger 66 initiates the merger routine by setting a loop counter C1 to zero (block 500), by setting a high relevance score variable to zero (block 501), by incrementing the loop counter C1 by one (block 502), by setting a sub-loop counter C2 to the loop counter value C1 plus one (block 504), and by retrieving the first concept from the search queue 76 (block 506).

At block 512, the selector 120 retrieves the concept specified by the sub-loop counter C2 from the search queue 76. For example, if this is the first time through the search queue 76 shown in FIG. 6, the loop counter C1 equals one, the sub-loop counter C2 equals two, and therefore, concept C1 equals "BIG" and concept C2 equals "ENOUGH". The selector 120 then creates a new concept by combining the concept specified by the loop counter C1 with the concept specified by the sub-loop counter C2 (block 514). The frequency generator 112 of the relevance finder 62 then calls the calculate global frequency routine (FIG. 18) to develop a new global frequency for the new compound concept (block 520).

Figure 18:
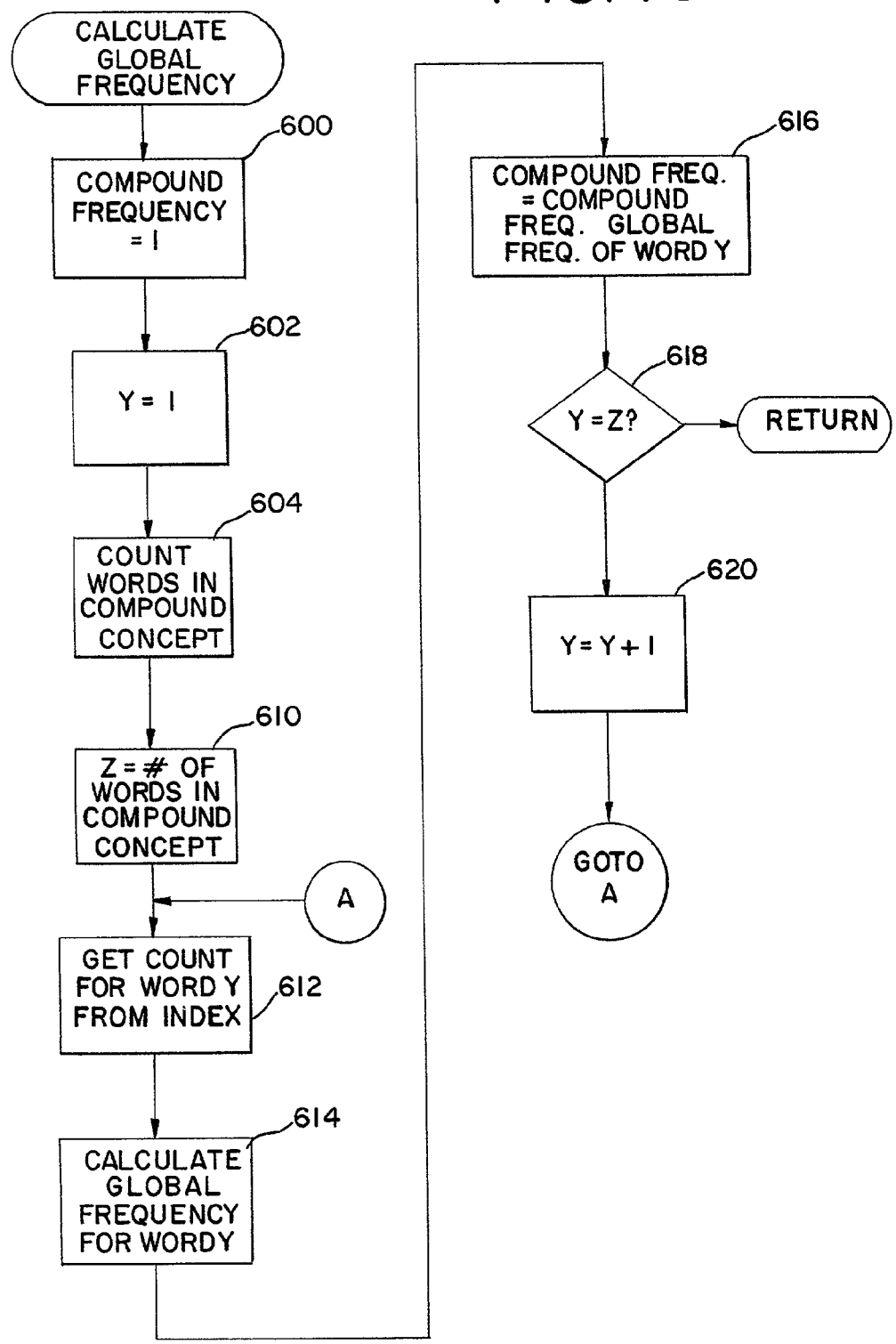
FIG. 18 is a flow chart illustrating the calculate global frequency routine.

As shown in FIG. 18, the frequency generator 112 initiates the calculate global frequency routine by setting a compound frequency variable and a loop counter Y to one (blocks 600 and 602). It then counts the number of single words contained in the new compound concept (block 604). A loop limit variable Z is then set to the number of words counted in the compound concept (block 610).

At block 612, the frequency generator 112 retrieves the global record count for the first word in the new compound concept from the index. It then calculates the global frequency for the first word in the new compound concept (block 614) and multiplies the calculated global frequency with the value in the compound frequency variable to develop a new value of the compound frequency variable (block 616).

The frequency generator 112 next determines whether the value in the loop counter Y equals the value in the loop limit variable Z (block 618). If so, the global frequency for the new compound variable has been computed and control returns to block 524 of FIG. 17B. Otherwise, the loop counter Y is incremented by one (block 620) and control returns to block 512 (FIG. 18). Control will continue looping through blocks 612–620 until the individual global frequencies of the single words in the new compound concept have been multiplied together (e.g., if three single words A, B & C make up the new compound concept then the loop stops executing when the global frequency of word A has been multiplied with the global frequency of word B and the product of the global frequencies of words A and B has been multiplied with the global frequency of word C). Once this has been achieved, the global frequency of the new compound concept has been estimated, and control returns to block 524 of FIG. 17B.

At block 524 (FIG. 17B), the selector 120 retrieves the subset lists for the concepts specified by the loop counter C1 and the sub-loop counter C2. The intersection generator 122 then creates a new subset list for the new concept by identifying the intersection of the subset list for the concepts specified by the loop and sub-loop counters C1, C2 (block 530). The frequency generator 112 then counts the number of records 42 identified in the new subset list (block 532) and calculates the local frequency for the new concept (block 534). The relevance calculator 114 then calculates a relevance score 78 for the new concept from the global and local frequencies as explained above (block 536).

At block 540, the improvement detector 124 of the merger 66 compares the relevance score 78 of the new concept to the value in the highest relevance score variable. If the relevance score 78 of the new concept is greater than the value in the highest relevance score variable, the improvement detector 124 stores the new concept, its global frequency and its subset list in memory (block 542). The improvement detector 124 also replaces the value in the highest relevance score variable with the relevance score 78 of the new concept and stores the relevance scores of each of the concepts (singular or compound) comprising the new compound concept in memory (block 544).

If the relevance score 78 of the new concept does not exceed the value in the highest relevance score variable (block 540), the new concept together with its global frequency, its relevance and its subset list is discarded. At block 546, the selector 120 of the merger 66 determines whether the concept specified by the sub-loop counter C2 is the last concept in the search queue 76. If not, the selector 120 increments the sub-loop counter C2 by one (block 548) and control returns to block 512 (FIG. 17A). Control will continue looping through blocks 512–548 until every concept in the search queue 76 has been paired with the concept specified by the loop counter C1 (block 546). When this occurs, control proceeds from block 546 to block 550.

At block 550 (FIG. 17B), the selector 120 of the merger 66 determines whether the loop counter C1 is equal to the sub-loop counter C2 minus one. If so, every concept that was in the search queue 76 prior to the initiation of the current merger cycle has been paired with every other concept that was in the search queue 76 prior to the current merger cycle, and control proceeds to block 551 (FIG. 17C). At block 551, the improvement detector 124 determines whether the value in the highest relevance score variable exceeds the individual relevance scores of each of the concepts (singular or compound) comprising the new compound concept. For example, if the compound concept identified as having the highest relevance score in the current merger cycle (i.e., identified via blocks 500–550) is BIG, BUTTON, TELEPHONE, the improvement detector compares: (a) the relevance score of the concept BIG, BUTTON, TELEPHONE to the relevance score of the concept BIG, (b) compares the relevance score of BIG, BUTTON, TELEPHONE to the relevance score of the concept BUTTON, and (c) compares the relevance score of BIG, BUTTON, TELEPHONE to the relevance score of the concept TELEPHONE. If these comparisons indicate that the relevance score of BIG, BUTTON, TELEPHONE is greater than the relevance score of the concept BIG, is greater than the relevance score of the concept BUTTON, and is greater than the relevance score of the concept TELEPHONE, control proceeds to block 552 where the new concept (e.g., BIG, BUTTON, TELEPHONE) is added to the search queue 76. Otherwise, no new concept is added to the search queue 76 during the current routine. Regardless of whether a concept is added to the search queue 76, control returns to block 511 of the main routine (FIG. 14B) and the search queue 76 is displayed at the analyst terminal. The database processor 18 then enters the loop represented by blocks 474 and 476 of FIG. 14B until a request to perform another merger cycle (block 474) or to initiate a new search (block 476) is received as explained above.

Returning to block 550 of FIG. 17B, if the loop counter C1 is not equal to the sub-loop counter C2 minus one, control returns to block 502 (FIG. 17A) where the loop counter C1 is incremented. The sub-loop counter C2 is then reset (block 504). The database processor 18 continues to execute the loop specified by blocks 502-550 until a relevance score 78 has been calculated for every new concept that can be created by combining any two of the concepts present in the search queue 76 as it existed at the initiation of the current merger cycle (block 550). Once this task is completed (block 550), one new concept is added to the search queue 76 (if appropriate) (block 552) and control returns to (block 511) of FIG. 14B.

Those skilled in the art will appreciate that, although the teachings of the invention have been described in connection with certain examples, there is no intention to limit the invention thereto. On the contrary, the intention of this patent is to cover all methods and apparatus fairly falling within the scope of the appended claims either literally or under the doctrine of equivalents.

What is claimed is:

1. In a computer readable storage medium having stored therein data representing instructions executable by a programmed processor for use with a database comprising a plurality of records containing text data, the storage medium comprising instructions for a database mining tool comprising:

a search engine and queue generator responsive to input search criteria for accessing the database to produce a search result identifying a subset of the records in the database, the search engine and queue generator also producing a first search queue from the search result, the first search queue including a plurality of concepts, each concept in the first search queue corresponding to a unique text element contained in at least one of the records in the search result;

a relevance finder for computing a relevance score for the concepts in the first search queue; and a merger for creating a compound concept by combining at least two concepts in the first search queue, the merger cooperating with the relevance finder to calculate a relevance score for the compound concept and to create a second search queue by adding the compound concept to the first search queue if the relevance score of the compound concept is greater than the relevance score of each of the at least two concepts.

2. A database mining tool as defined in claim 1 wherein the relevance finder comprises a counter that develops a set count indicative of a number of records in the database containing a given concept and that develops a subset count indicative of a number of records in the search result containing the given concept.

3. A database mining tool as defined in claim 2 wherein the relevance finder further comprises a frequency generator that generates a global frequency for the given concept by dividing the set count for the given concept by a total number of records in the database and that generates a local frequency for the given concept by dividing the subset count for the given concept by a total number of records identified in the search result.

4. A database mining tool as defined in claim 3 wherein the relevance finder further comprises a relevance calculator that calculates the relevance score for the given concept by dividing the local frequency by the global frequency.

5. A database mining tool as defined in claim 1 further comprising a relevance sorter that sorts the concepts in the first search queue based on the relevance scores.

6. A database mining tool as defined in claim 1 wherein the merger further comprises an intersection generator for developing a new set list for the compound concept from at least two set lists corresponding to the at least two concepts in the first search queue, wherein each of the at least two set lists identify each record in the database containing the corresponding concept, and wherein the new set list identifies each record appearing in each of the at least two set lists.

7. A database mining tool as defined in claim 1 wherein the merger further comprises an intersection generator for developing a new subset list for the compound concept from at least two subset lists corresponding to the at least two concepts in the first search queue, wherein each of the at least two subset lists identify each record in the search result containing the corresponding concept, and wherein the new subset list identifies each record appearing in each of the at least two subset lists.

8. A database mining tool as defined in claim 7 wherein the relevance finder develops a new subset count for the compound concept by counting the records identified in the new subset list.

9. A database mining tool as defined in claim 8 wherein the relevance finder further comprises a frequency generator that generates a local frequency for the compound concept by dividing the new subset count for the compound concept by a total number of records identified in the search result.

10. A database mining tool as defined in claim 9 wherein the relevance finder further comprises a relevance calculator that calculates the relevance score for the compound concept by dividing the local frequency by a global frequency.

11. A database mining tool as defined in claim 10 wherein the relevance generator generates the global frequency for the compound concept by determining a global frequency for each of the at least two concepts comprising the compound concept, and by multiplying the global frequencies of the at least two concepts together.

12. A method of mining a database including a plurality of records containing text data, the method comprising the steps of:

responding to input search criteria by accessing the database to produce a search result identifying a subset of the records in the database;

producing a first search queue from the search result, the first search queue including a plurality of concepts, each concept in the first search queue corresponding to a unique text element contained in at least one of the records in the search result;

computing a relevance score for the concepts in the first search queue;

creating a compound concept by combining at least two concepts in the first search queue;

computing a relevance score for the compound concept; and creating a second search queue by adding the compound concept to the first search queue if the relevance score of the compound concept is greater than the relevance score of each of the at least two concepts.

13. A method as defined in claim 12 wherein the step of computing a relevance score for the concepts in the first search queue further comprise the steps of:

developing a set count indicative of a number of records in the database containing a given concept;

developing a subset count indicative of a number of records in the search result containing the given concept;

generating a global frequency for the given concept by dividing the set count for the given concept by a total number of records in the database;

generating a local frequency for the given concept by dividing the subset count for the given concept by a total number of records identified in the search result; and calculating the relevance score for the given concept by dividing the local frequency by the global frequency.

14. A method as defined in claim 13 further comprising the step of sorting the concepts in the first search queue based on the relevance scores.

15. A method as defined in claim 12 wherein the step of computing a relevance score for the compound concept further comprises the steps of:

developing a new set list for the compound concept from at least two set lists corresponding to the at least two concepts in the first search queue, wherein each of the at least two set lists identify each record in the database containing the corresponding concept, and wherein the new set list identifies each record appearing in each of the at least two set lists;

developing a new subset list for the compound concept from at least two subset lists corresponding to the at least two concepts in the first search queue, wherein each of the at least two subset lists identify each record in the search result containing the corresponding concept, and wherein the new subset list identifies each record appearing in each of the at least two subset lists;

developing a new set count for the compound concept by counting the records identified in the new set list;

developing a new subset count for the compound concept by counting the records identified in the new subset list;

generating a global frequency for the compound concept by dividing the new set count for the compound concept by a total number of records in the database;

generating a local frequency for the compound concept by dividing the new subset count for the compound concept by a total number of records identified in the search result; and calculating the relevance score for the compound concept by dividing the local frequency by the global frequency.

16. A method as defined in claim 12 wherein the step of computing a relevance score for the compound concept further comprises the steps of:

developing a new subset list for the compound concept from at least two subset lists corresponding to the at least two concepts in the first search queue, wherein each of the at least two subset lists identify each record in the search result containing the corresponding concept, and wherein the new subset list identifies each record appearing in each of the at least two subset lists;

developing a new subset count for the compound concept by counting the records identified in the new subset list;

generating a global frequency for the compound concept;

generating a local frequency for the compound concept by dividing the new subset count for the compound concept by a total number of records identified in the search result; and calculating the relevance score for the compound concept by dividing the local frequency by the global frequency.

17. A database mining tool as defined in claim 16 wherein the relevance generator generates the global frequency for the compound concept by determining a global frequency for each of the at least two concepts comprising the compound concept, and by multiplying the global frequencies of the at least two concepts together.

* * * * *